United States Patent
Prakash et al.

(10) Patent No.: US 6,600,786 B1
(45) Date of Patent: Jul. 29, 2003

(54) METHOD AND APPARATUS FOR EFFICIENT VIDEO PROCESSING

(75) Inventors: Adityo Prakash, Redwood Shores, CA (US); Eniko F. Prakash, Redwood Shores, CA (US)

(73) Assignee: Pulsent Corporation, Milpitas, CA (US)

(*) Notice: Subject to any disclaimer, the term of this patent is extended or adjusted under 35 U.S.C. 154(b) by 0 days.

(21) Appl. No.: 09/550,705

(22) Filed: Apr. 17, 2000

Related U.S. Application Data

(60) Provisional application No. 60/129,854, filed on Apr. 17, 1999, and provisional application No. 60/129,853, filed on Apr. 17, 1999.

(51) Int. Cl.[7] .................................................. H04N 7/12
(52) U.S. Cl. ............................ 375/240.25; 375/240.08
(58) Field of Search ....................... 375/240.08, 240.09, 375/240.12, 240.16, 240.19, 240.2, 240.25, 240.28, 240.26, 240.29; 382/173, 236, 238, 241–243, 248–250

(56) References Cited

U.S. PATENT DOCUMENTS

| | | |
|---|---|---|
| 5,485,279 A | 1/1996 | Yonemitsu et al. |
| 5,654,760 A | 8/1997 | Ohtsuki |
| 5,657,086 A | 8/1997 | Tahara et al. |
| 5,703,646 A | 12/1997 | Oda |
| 5,719,986 A | 2/1998 | Kato et al. |
| 5,926,572 A * | 7/1999 | Kim et al. .................. 382/238 |
| 6,026,182 A | 2/2000 | Lee et al. |
| 6,055,330 A * | 4/2000 | Eleftheriadis et al. ....... 382/154 |
| 6,057,884 A | 5/2000 | Chen et al. |
| 6,058,211 A * | 5/2000 | Bormans et al. ............ 382/235 |
| 6,185,363 B1 * | 2/2001 | Dimitrova et al. ............ 386/69 |

OTHER PUBLICATIONS

Nicholls et al, "Scalable video with background segmentation", International Conference on Image Processing, vol. 1, pp. 529–532, Sep. 1996.*

Kim et al, "Novel practal image compression method with non–iterative decoder", International Conference on Image Processin vol. 3, pp. 268–271, Oct. 1995.*

* cited by examiner

*Primary Examiner*—Vu Le
(74) *Attorney, Agent, or Firm*—Townsend and Townsend and Crew LLP; Philip H. Albert

(57) ABSTRACT

A video compression method and apparatus uses an active decoder. The corresponding encoder can produce an encoded bitstream with a greatly reduced overhead by encoding a reference frame based on the structural information inherent to the image (e.g., image segmentation, geometry, color, and/or brightness), and then predicting other frames relative to the structural information. Typically, the description of a predicted frame would include kinetic information (e.g., segment motion data and/or associated residues representing information in previously occluded areas and/or inexact matches and appearance of new information, and portion of the segment evolution that is not captured by motion per se, etc.). Because the decoder is capable of independently determining the structural information (and relationships thereamong) underlying the predicted frame, such information need not be explicitly transmitted to the decoder. Rather, the encoder need only send information that the encoder knows the decoder cannot determine on its own.

25 Claims, 30 Drawing Sheets

ENCODER DESCRIPTION

| | |
|---|---|
| 201 | The encoder obtains a reference image frame. |
| 202 | The encoder encodes the image frame from step 201 and transmits it to the decoder. |
| 203 | The encoded image from the previous step is reconstructed by the encoder, in the same manner as the decoder will. |
| 204 | The encoder determines the structural information, i.e.segments, the reconstructed image from step 204. Alternatively, the encoder segments the original reference image frame from step 201. |
| 205 | The segments determined in step 204 are ordered by the encoder, in the same manner as the decoder will. |
| 206 | The encoder obtains a new image frame. |
| 207 | The motion related information of each segment is determined by motion matching. |
| 208 | The encoder encodes the motion information. |
| 209 | Based on the motion information from step 208, previously hidden regions, also known as the background residue, in the first frame may be exposed in the second frame. |
| 210 | The encoder orders the background residue locations, in the same manner as the decoder will. |
| 211 | The encoder attempts to fill each of the background residue locations (i.e., predict the background residues) from steps 209 and 210; |
| 212 | The encoder determines the difference between the predicted fill and the actual fill for each of the background residue areas. |
| 213 | The encoder determines the local residue areas in the second image frame, from the segment motion information. |
| 214 | The encoder orders the local residues from step 213, in the same manner as the decoder will. |
| 215 | The encoder encodes the background and local residues from steps 212 and 214. |
| 216 | If the image can be reasonably reconstructed primarily from the motion information, with assistance from the background residue and the local segment residues, the encoder transmits the following information, and reconstructs the second frame, as the decoder will, and continues at step 206:<br>    a. Flag denoting that the second frame is not a keyframe<br>    b. The motion related information for the segments<br>    c. Special instructions for segments<br>    d. The background residue information with flags denoting coding<br>    e. The local residue information along with flags denoting coding |
| 217 | If the image cannot be reconstructed in relation to the reference frame, the image is encoded as a key frame, a flag is transmitted to so inform the decoder, and the encoder continues at step 202. |

FIG. 2

DECODER DESCRIPTION

| | |
|---|---|
| 401 | The decoder receives an encoded image frame. |
| 402 | The encoded image frame from step 401 is reconstructed by the decoder in the same manner as the encoder. |
| 403 | The reconstructed image frame from step 402 is segmented and ordered by the decoder in the same manner as the encoder. |
| 404 | The decoder receives a flag from the encoder stating whether the subsequent frame is a keyframe, i.e. not represented in relation to any other frame. If so, then the decoder returns to step 401. |
| 405 | The decoder receives motion related information regarding the segments determined in step 403 from the encoder. |
| 406 | The decoder begins to reconstruct a subsequent image frame using the segments obtained in step 403 and motion related information obtained in step 404. |
| 407 | Based on the motion related information from step 404 regarding the segments determined in step 403, the decoder determines where areas, previously hidden, are now revealed, also known as the background residue. |
| 408 | The background residue locations from step 406 are ordered in the same manner as by the encoder. |
| 409 | The decoder attempts to fill the background residue locations; thereby predicting the background residue information. |
| 410 | The decoder receives additional background residue information (i.e., relative to the predicted background residue) plus flags denoting the coding method for the additional background residue information from the encoder. |
| 411 | The decoder decodes the additional background residue information. |
| 412 | The computed background residue information and the additional background residue information is added to the second image frame. |
| 413 | Based on the motion information from step 404 regarding the segments determined in step 403, the decoder determines the location of the local segment residues, if any. |
| 414 | The local segment residue locations are ordered in the same manner as by the encoder. |
| 415 | The decoder receives coded local segment residue information plus flags denoting the coding method for each local segment residue location. |
| 416 | The decoder decodes the local segment residue information. |
| 417 | The decoded local segment residue information is added to the second frame. |
| 418 | The decoder receives any special instructions and adds them to the second frame. |
| 419 | Reconstruction of the second frame is complete. |
| 420 | If there are more frames, the routine continues at step 404. |

FIG. 4

ENCODER/DECODER SYSTEM

| | Encoder | | Decoder |
|---|---|---|---|
| 601 | Obtain, encode, transmit reference frame | → | Receive reference frame |
| 602 | Reconstruct reference frame | | Reconstruct reference frame |
| 603 | Obtain Structural Information | | Obtain identical Structural Information |
| 604 | Order segments | | Order segments |
| 605 | Obtain 2nd image frame | | |
| 606 | Determine motion relation information | | |
| 606a | Group by Multi-scaling and/or prediction from previous motion related information | | |
| 606b | Predict segment motion data | | |
| 607 | Encode any motion related information relative to grouping and prediction | | |
| 608 | Determine background residue | | |
| 609 | Order background residues | | |
| 610 | Predict background residue | | |
| 611 | Determine sufficiency of prediction | | |
| 612 | Determine local residue | | |
| 613 | Order local residue locations | | |
| 614 | Encode background and local residue | | |
| 615 | Is 2nd frame keyframe?  If yes, go to step 601 | → | Receive keyframe flag |
| 616 | Transmit motion related information | → | Receive motion related information |
| 616a | | | Group segments by Multi-scaling and/or prediction from previous motion related information exactly as in step 606a. |
| 616b | | | Predict segment motion data as in step 606b. |
| 617 | | | Determine and order background and local residue locations exactly as in steps 608, 609, 612, and 613 |
| 618 | | | Predict background residue as in step 610. |
| 619 | Transmit background and local residue information | → | Receive background and local residue information |
| 620 | | | Decode background and local residue information |
| 621 | Transmit special instructions | → | Receive special instructions |
| 622 | Reconstruct 2nd Frame | | Reconstruct 2nd Frame |
| 623 | Go to step 605 | | Go to step 605 |

FIG. 6

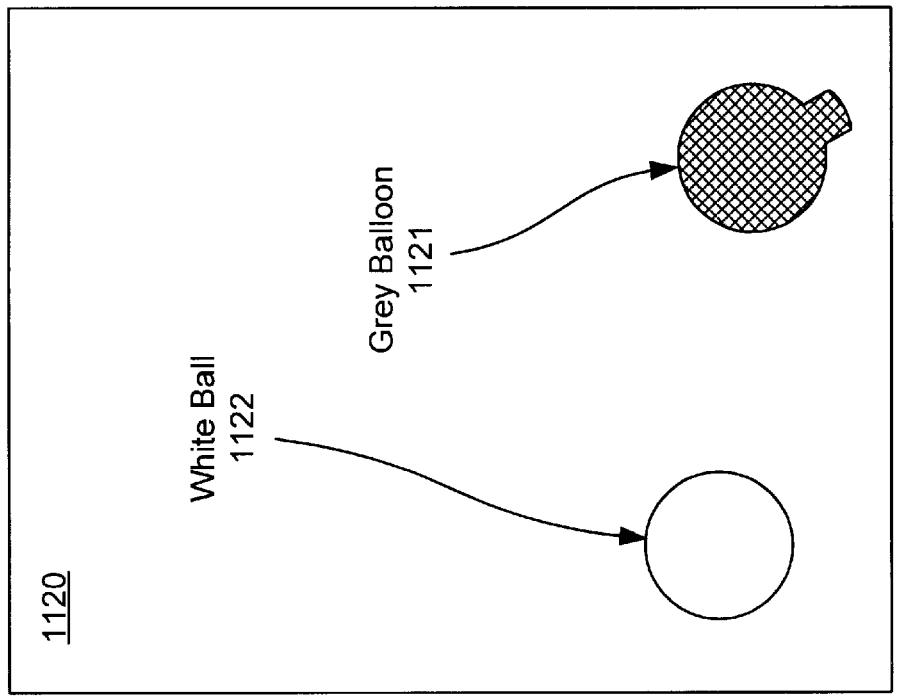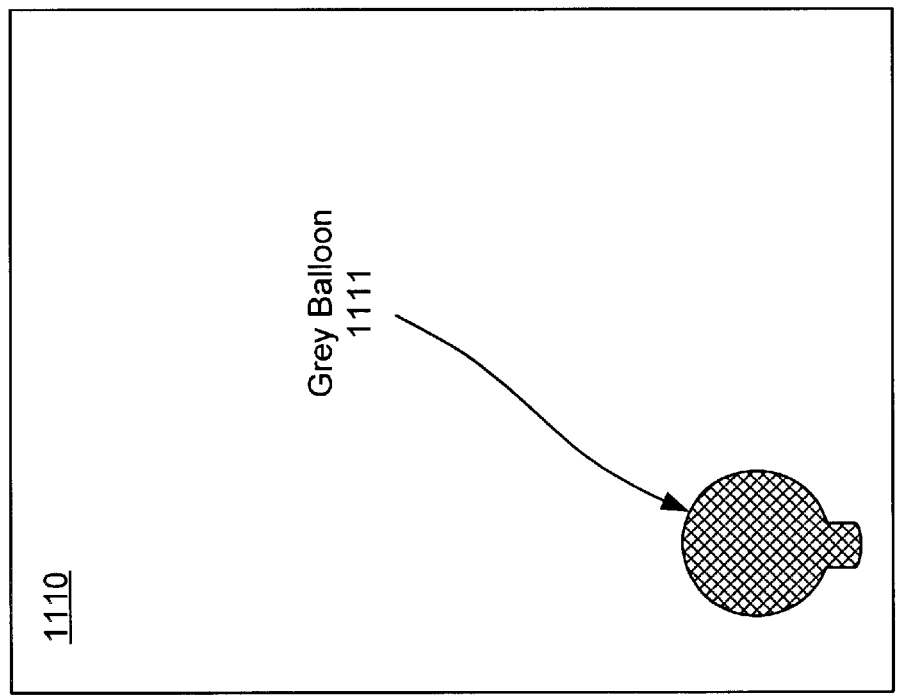
FIG. 11

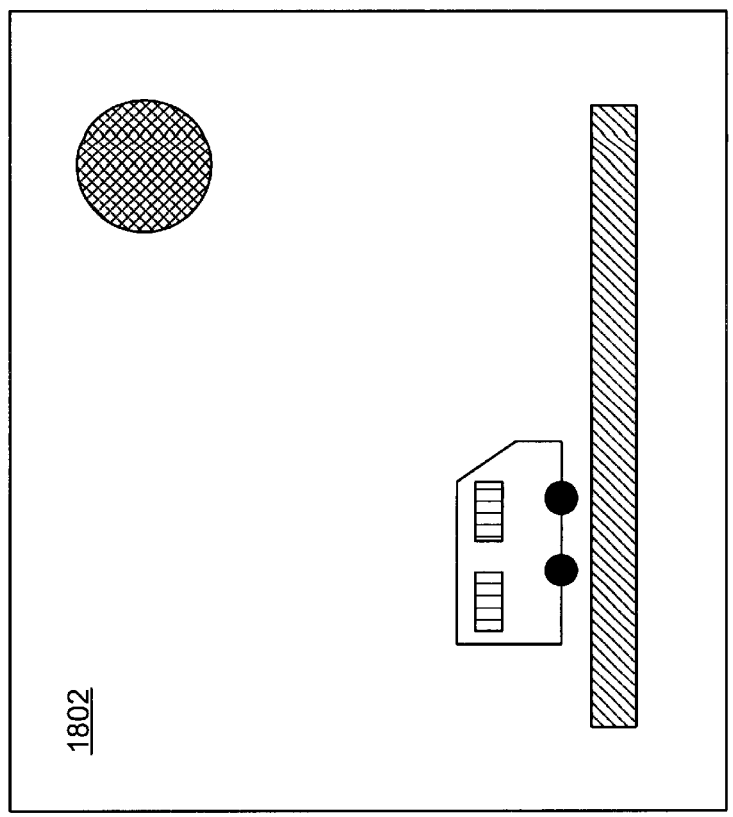
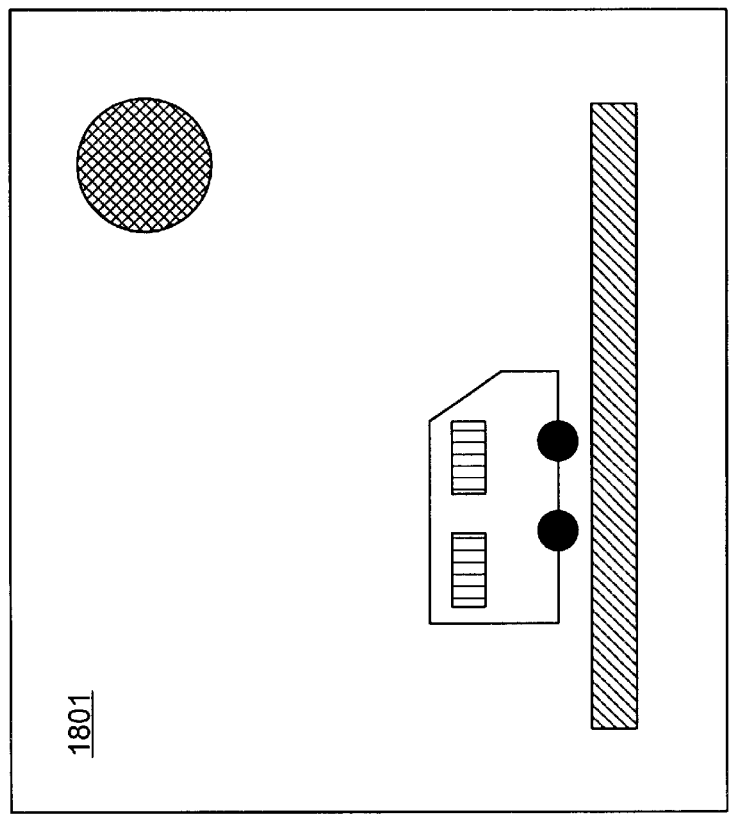
FIG. 18

METHOD AND APPARATUS FOR EFFICIENT VIDEO PROCESSING

CROSS-REFERENCES TO RELATED APPLICATIONS

This application claims the benefit of U.S. Provisional Patent Application No. 60/129,853, filed on Apr. 17, 1999, and No. 60/129,854, filed on Apr. 17, 1999.

FIELD OF THE INVENTION

The present invention relates generally to the compression of video data, and more particularly to a synchronized encoder and smart decoder system for the efficient transmittal and storage of motion video data.

BACKGROUND OF THE INVENTION

1. Brief Introduction

As consumers desire more video-intensive modes of communications, the limited bandwidth of current transmission modes (e.g., broadcast, cable, telephone lines, etc.) becomes prohibitive. The introduction of the Internet, and the subsequent popularity of the world wide web, video conferencing, and digital & interactive television require more efficient ways of utilizing existing bandwidth. Further, video-intensive applications require immense storage capacity. The advent of multi-media capabilities on most computer systems have taxed traditional storage devices, such as hard drives, to the limit.

Compression allows digital motion video to be represented efficiently and cheaply. The benefit of compression is that it allows more information to be transmitted in a given amount of time, or stored in a given storage medium. The ultimate goal of video compression is to reduce the bitstream, or video information flow, of the video sequences as much as possible, while retaining enough information that the decoder or receiver can reconstruct the video image sequences in a manner adequate for the specific application, such as television, videoconferencing, etc.

Most digital signals contain a substantial amount of redundant, superfluous information. For example, a stationary video scene produces nearly identical images in each scene. Most video compression routines attempt to remove the superfluous information so that the related image frames can be represented in terms of previous image frame(s), thus eliminating the need to transmit the entire scene of each video frame. Alternatively, routines like motion JPEG, code each video frame separately and ignore temporal redundancy./

2. Previous Attempts

There have been numerous attempts at adequately compressing video imagery. These methods generally fall into the following two categories: 1) spatial redundancy reduction, and 2) temporal redundancy reduction.

2.1 Spatial Redundancy Reduction

The first type of video compression focuses on the reduction of spatial redundancy, i.e., taking advantage of the correlation among neighboring pixels in order to derive a more efficient representation of the important information in an image frame. These methods are more appropriately termed still-image compression routines, as they work reasonably well on individual video image frames but do not attempt to address the issue of temporal, or frame-to-frame, redundancy, as explained in Section 2.2. Common still-image compression schemes include JPEG, wavelets, and fractals.

2.1.1 JPEG/DCT Based Image Compression

One of the first commonly used methods of still-image compression was the direct cosine transformation ("DCT") compression system, which is at the heart of JPEG.

DCT operates by representing each digital image frame as a series of cosine waves or frequencies. Afterwards, the coefficients of the cosine series are quantized. The higher frequency coefficients are quantized more harshly than those of the lower frequencies. The result of the quantization is a large number of zero coefficients, which can be encoded very efficiently. However, JPEG and similar compression schemes do not address the crucial issue of temporal redundancy.

2.1.2 Wavelets

As a slight improvement to the DCT compression scheme, the wavelet transformation compression scheme was devised. This system is similar to the DCT, differing mainly in that an image frame is represented as a series of wavelets, or windowed oscillations, instead of as a series of cosine waves.

2.1.3 Fractals

Another technique is known as fractal compression. The goal of fractal compression is to take an image and determine a single function, or a set of functions, which fully describe(s) the image frame. A fractal is an object that is self-similar at different scales or resolutions, i.e., no matter what resolution one looks at, the object remains the same. In theory, where fractals allow simple equations to describe complex images, very high compression ratios shall be achievable.

Unfortunately, fractal compression is not a viable method of general compression. The high compression ratios are only achievable for specially constructed images, and only with considerable help from a person guiding the compression process. In addition, fractal compression is very computationally intensive.

2.2 Temporal and Spatial Redundancy Reduction

Adequate motion video compression requires reduction of both temporal and spatial redundancies within the sequence of frames that comprise video. Temporal redundancy removal is concerned with the removal from the bitstream of information that has already been coded in previous image frames. Block matching is the basis for most currently used effective means of temporal redundancy removal.

2.2.1 Block-Based Motion Estimation

In block matching, the image is subdivided into uniform size blocks (more generally, into polygons), and each block is tracked from one frame to another and represented by a motion vector, instead of having the block re-coded and placed into the bitstream for a second time. Examples of compression routines that use block matching include MPEG, and variants thereof.

MPEG encodes the first frame in a sequence of related frames in its entirety as a so-called intra-frame, or I-frame. An I-frame is a type of key frame, meaning an image frame which is completely self-contained and not described in relation to any other image frame. To create an I-frame, MPEG performs a still-image compression on the first frame, including dividing the frame into 16 pixel by 16 pixel square blocks. Other (so-called "predicted") frames are encoded with respect to the I-frame by predicting corresponding blocks of the other frame in relation to that of the I-frame. That is, MPEG attempts to find each block of an I-frame within the other frame. For each block that still exists in the other frame, MPEG transmits the motion vector, or movement, of the block along with block identifying information. However, as a block moves from frame to frame, it may change slightly. The difference relative to the I-frame is known as residue. Additionally, as blocks move, previously hidden areas may become visible for the first time. These previously hidden areas are also known as residue. That is, the collective remaining information after the block motion is sent is known as the residue, which is coded using JPEG and sent to the receiver to complete the image frame.

Subsequent frames are predicted with respect to either the blocks of the I-frame or a preceding predicted frame. In addition, the prediction can be bi-directional, i.e., with reference to both preceding and subsequent I-frames or predicted frames. The prediction process continues until a new key frame is inserted, at which point a new I-frame is encoded and the process repeats itself.

Although state of the art, block matching is highly inefficient and fails to take advantage of the known general physical characteristics or other information inherent in the images. The block method is both arbitrary and crude, as the blocks do not have any relationship with real objects in the image. A given block may comprise a part of an object, a whole object, or even multiple dissimilar objects with unrelated motion. In addition, neighboring objects will often have similar motion. However, since blocks do not correspond to real objects, block-based systems cannot use this information to further reduce the bitstream.

Yet another major limitation of block-based matches arises because the residue created by block-based matching is generally noisy and patchy. Thus, block-based residues do not lend themselves to good compression via standard image compression schemes such as DCT, wavelets, or fractals.

2.3 Alternatives

It is well recognized that the state of the art needs improvement, specifically in that the block-based method is extremely inefficient and does not produce an optimally compressed bitstream for motion video information. To that end, the very latest compression schemes, such as MPEG4, allow for the inclusion of limited structural information, if available, of selected items within the frames rather than merely using arbitrary-sized blocks. While some compression gains are achieved, the associated overhead information is substantially increased because, in addition to the motion and residue information, these schemes require that structural or shape information for each object in a frame must also be sent to the receiver. This is so because all current compression schemes use a dumb receiver—one which is incapable of making any determinations of the structure of the image by itself.

Additionally, as mentioned above, the current compression methods treat the residue as just another image frame to be compressed by JPEG using a fixed compression technique, without attempting to determine if other, more efficient methods are possible.

3. Advantages of the Present Invention

This invention presents various advantages regarding the problem of video compression. As described above, the goal of video compression is to represent accurately a sequence of video frames with the smallest bitstream, or video information flow. As previously stated, spatial redundancy reduction methods above are inadequate for motion video compression. Further, the current temporal and spatial redundancy reduction methods, such as MPEG, waste precious bitstream space by having to transmit a lot of overhead information.

Thus, there is a need for an improved technique for encoding (and decoding) video data exhibiting increased compression efficiency, reduced overhead, and smaller encoded bitstreams.

SUMMARY OF THE INVENTION

Compression of digital motion video is the process by which superfluous or redundant information, both spatial and temporal, contained within a sequence of related video frames is removed. Video compression allows the sequence of frames to be represented by a reduced bitstream, or data flow, while retaining its capacity to be reconstructed in a visually sufficient manner.

Traditional methods of video compression place most of the compression burden, (e.g., computational and/or transmittal) on the encoder, while minimally using the decoder. In the traditional video encoder/decoder system, the decoder is "dumb" or passive. The encoder makes all the calculations, informs the decoder of its decisions, then transmits the video data to the decoder along with instructions for reconstruction of each image.

In contrast, the present invention includes a "smart" or active decoder that performs much of the transmission and instructional burden that would otherwise be required of the encoder, thus greatly reducing the overhead and resulting in a much smaller encoded bitstream. Thus, the corresponding (i.e., compatible) encoder of the present invention can produce an encoded bitstream with a greatly reduced overhead. This is achieved by encoding a reference frame based on the structural information inherent to the image (e.g., image segmentation, geometry, color, and/or brightness), and then predicting other frames relative to the structural information. Typically, the description of a predicted frame would include kinetic information (e.g., segment motion data and/or associated residues resulting from uncovering of previously occluded areas and/or inexact matches and appearance of new information, etc.) representing the kinetics of corresponding structures (e.g., image segments) from an underlying reference frame. Because the decoder is capable of independently determining the structural information (and relationships thereamong) underlying the predicted frame, such information need not be explicitly transmitted to the decoder. Rather, the encoder need only send information that the encoder knows the decoder cannot determine on its own.

In another aspect or embodiment of the invention, the decoder and encoder both make the same predictions about subsequent images based on a past sequence of related images, and these predictions (rather than or in addition to the structural information per se) are used as the basis for encoding the actual values of the subsequent images. Thus, the encoder can simply send the difference between the prediction and the actual values, which also reduces the bitstream.

In still other aspects or embodiments of the invention, the decoder can reproduce decisions made by the encoder as to segment ordering or segment association/disassociation, so that such decisions need not be transmitted to the decoder.

In still another aspect or embodiment of the invention, the encoder can encode predictions using a variety of compression techniques, and instruct the decoder to use a corresponding decompression technique.

The foregoing and other aspects and embodiments of the invention will be described in greater detail below.

BRIEF DESCRIPTION OF THE DRAWINGS

FIG. 2 is a flow chart illustrating the operation of an encoder according to one embodiment of the invention.

FIG. 4 is a flow chart illustrating the operation of a decoder according to one embodiment of the invention.

FIG. 6 is a flow chart illustrating the operation of a codec according to one embodiment of the invention.

FIG. 11 is an illustration of motion matching according to one embodiment of the invention.

FIG. 18 is an illustration of local residues.

DESCRIPTION OF THE SPECIFIC EMBODIMENTS

1. Overview

The following sections provide a description of one embodiment of the invention using an encoder a decoder, and structural information (hereinafter in this embodiment "segments") including details specific to this embodiment and not necessarily required in other embodiments of the invention.

1.1 Encoder

Figure 1:
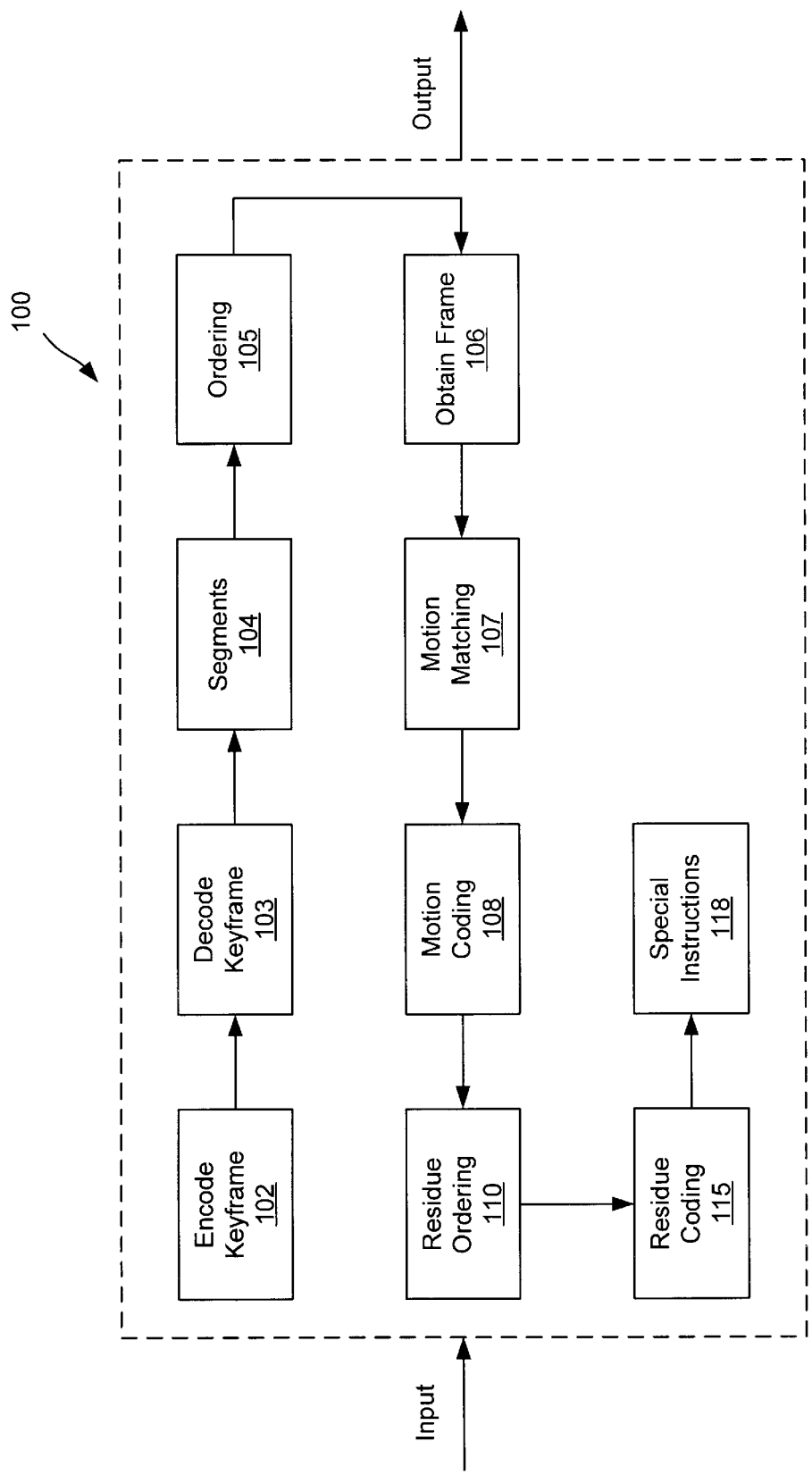
FIG. 1 is a block diagram of an encoder according to one embodiment of the invention.
Figure 3:
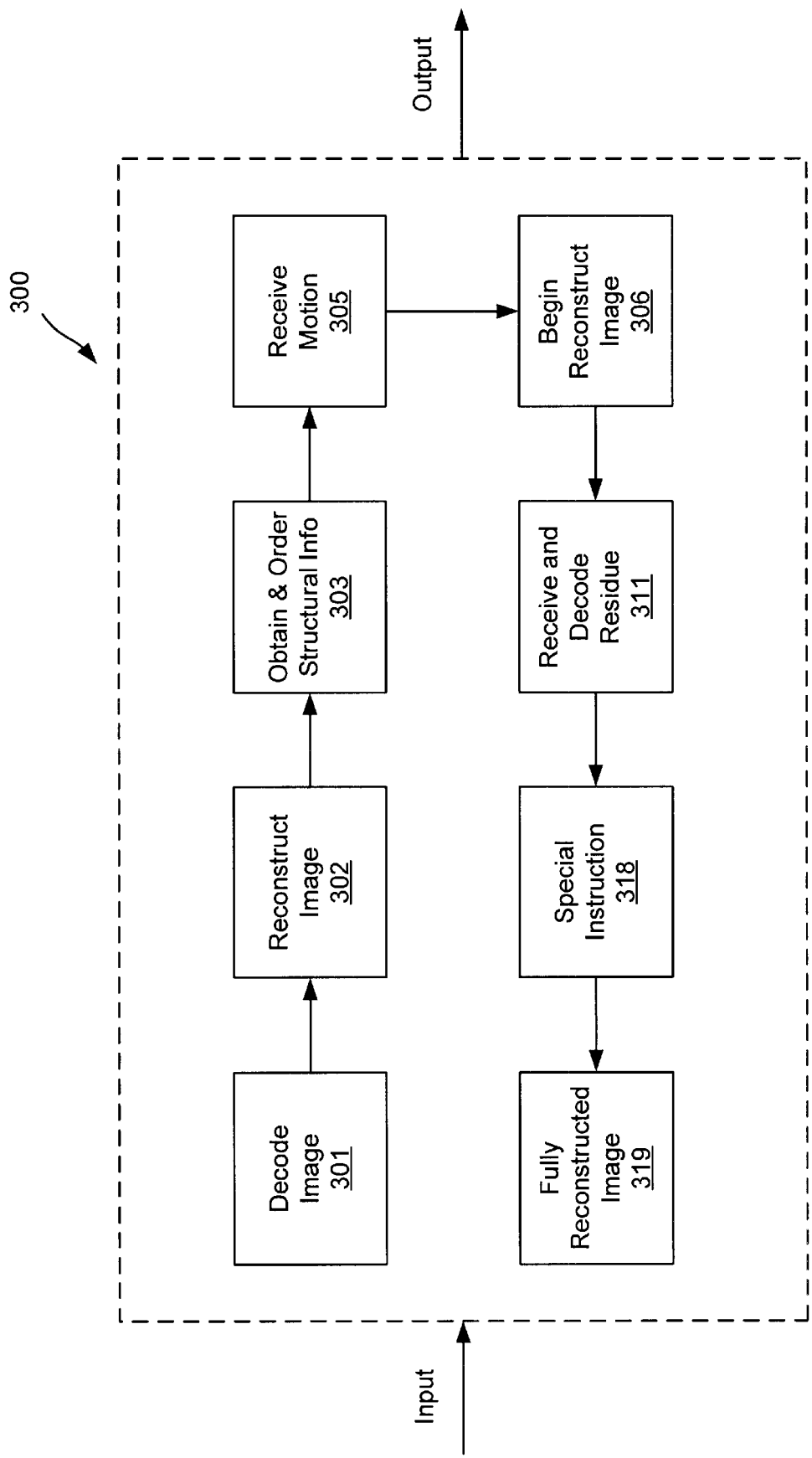
FIG. 3 is a block diagram of a decoder according to one embodiment of the invention.

FIG. 1 is a block diagram of an exemplary encoder for use with a compatible decoder as will be described later with respect to FIG. 3 and FIG. 4, and FIG. 2 is an overview of the operation of the encoder of FIG. 1. At step 201, encoder 100 obtains a first (e.g., reference) image frame. At step 202, functional block 102 of encoder 100 encodes the image frame from step 201. At step 203, the encoded image from step 202 is reconstructed by functional block 103 of encoder 100, in the same manner as the decoder will reconstruct the image. At step 204, functional block 104 of encoder 100 segments i.e. obtains the structural information from, the reconstructed image, the segments being used as the basis for predicting subsequent frames in terms of the kinetics (e.g., motion and/or residue data) of the segments. Those skilled in the art will readily appreciate how to perform image segmentation, using techniques such as edge detection, edge linking, region merging, or the watershed method, that need not be described in detail here. Alternatively, step 203 is skipped and the encoder segments the original reference image frame from step 201. This may provide some increase in encoder efficiency, by eliminating the segment reconstruction step, while providing a basis for predictions that is still sufficiently similar to the decoder-reconstructed image to avoid significant errors. At step 205, the segments determined in step 204 are ordered by functional block 105 of encoder 100, in the same manner as the decoder will order them. In one embodiment this is performed according to a predetermined, canonical ordering scheme known to both the encoder and the decoder.

At step 206, functional block 106 of encoder 100 obtains a new (e.g., second) image frame to be encoded relative to the segmented reference frame. At step 207, motion related information for each of the segments generated in step 204 is determined by functional block 107 of encoder 100 by motion matching, i.e., Motion matching is the process of determining the change of location of an image segment from one from frame to another frame. Motion matching may be applied forwards, backwards, and/or to non-sequential frames.

At step 208, functional block 108 of encoder 100 encodes the motion related information.

At step 209, based on the motion related information from step 208, previously hidden regions (hereinafter the background residue) in the reference frame may become exposed in the new frame. At step 210, functional block 110 of encoder 100 orders the background residues, in the same manner as the decoder will, using a common, predetermined, canonical ordering scheme. At step 211, encoder 100 attempts to fill each of the background residues by extrapolating from known segment values using techniques such as linear, polynomial, or other predictive techniques. Filling may also be aided by considering information regarding the ordering or hierarchy of segments surrounding the newly exposed area. The ordering of the segments defines the depth information which is known as Z-ordering. For example, if the image were an aerial view of the motion of the car in FIG. 7, the area exposed by motion of the segment representing the car, (segment 71) could be predicted based on the segment representing the road, (segment 72) underlying the car. At step 212, the encoder determines the difference between the actual and predicted values of each of the background residue areas.

In addition to background residues caused by the exposure of previously occluded areas, there can be local residues, which, for example, are associated with the inexact matches, and appearance of new information. Hence, a full description of the overall kinetics of the segments includes consideration of motion data and residue data (both background and local), all of which shall be collectively referred to as kinetic information. At step 213, the encoder determines the local residue areas in the second image frame, from the segment motion related information. At step 214, the functional block 110 of encoder 100 orders the local residues from step 113, in the same manner as the decoder will, using a common, predetermined, canonical ordering scheme. At step 215, functional block 115 of encoder 100 encodes the background residues from step 212 and the local residues from step 213. In one embodiment, the encoding may use one of many available techniques selected based on the particular structure of the residue as instantaneously determined by the decoder.

If the image of the second frame can be reasonably reconstructed primarily from the motion related information with assistance from the residue information, then, at step 216, the encoder transmits the following information for decoding either directly, (e.g., in a videoconferencing application) or indirectly (e.g., written to a storage medium to be decoded upon later playback): (a) a flag indicating that the frame is not a key frame; (b) the motion related information for the segments; (c) the background residue information, if needed (optionally: along with flags denoting the coding technique used); and (d) the local residue information, if needed (optionally: along with flags denoting coding the technique used). After transmission, the encoder repeats the cycle, starting at step 206, with a new (e.g., third) image frame to be encoded with respect to a previous reference frame. The previous reference frame can be the existing key frame or a non-key frame, (i.e. reconstructed video frame) If, however, the second image cannot be reasonably reconstructed primarily from the motion related information with assistance from the residue information, then, at step 217, the image is encoded as a key frame and transmitted to the decoder along with a flag indicating that the frame is a key frame. After transmission, the encoder repeats the cycle, starting at step 203.

Transmission can also include the transmission, by functional block 118, of any special instructions associated with a frame.

Alternatively instead of determining the kinetic information from the segments of the first frame, as described in FIGS. 1 and 2, the encoder uses the structural information from the first frame to determine the best set of basis functions or building block to describe a second frame. This set of basis functions will be the same set as the decoder will determine thus only the coefficients for the second frame need transmitting from the encoder to the decoder.

1.2 Decoder

FIG. 3 is a block diagram of exemplary decoder for use with a compatible encoder as described in FIG. 1 and FIG. 2, and FIG. 4 is an overview of the operation of the decoder of FIG. 3. At step 401, functional block 301 of decoder 300 receives an encoded image frame (e.g., an encoded reference frame produced at step 202 of FIG. 2). At step 402, the encoded image frame from step 401 is reconstructed by functional block 302 of decoder 300 in the same manner as the encoder. At step 403, the structural information of the reconstructed image frame from step 402 is determined and ordered, in the same manner as the encoder, by functional block 303 of decoder 300. At step 404, the decoder receives a flag from the encoder stating whether the subsequent image frame (e.g., see step 206 of the encoder description) is a key frame. If it is, the decoder returns to step 401. If it is not, the decoder continues at step 405.

At step 405, functional block 305 of decoder 300 receives motion related information (e.g., motion and/or residue data) for the segments. At step 406, the decoder begins to reconstruct a subsequent image frame using the segments obtained in step 403 and the motion portion of the kinetic information obtained in step 405.

At step 407, based on the motion related information from step 404 regarding the segments determined in step 403, the decoder determines locations where previously hidden image portions, if any, are now revealed. These are known as the background residue locations. At step 408, the computed background residue locations from step 407 are ordered in the same manner as by the encoder, using a common, predetermined, canonical protocol. At step 409, the decoder attempts to fill the background residue locations (i.e., predict the background residue information) using the same type of predictive fill technique as used by the encoder. At step 410, the decoder receives encoded background residue information (relative to the predicted background residue information), plus flags denoting the coding method therefor, from the encoder (FIG. 2, step 216(c)). At step 411, functional block 311 of decoder 300 decodes the received background residue information. At step 412, the predicted (computed) background residue information, if any, is added to the received background residue information to determine the overall background residue information, which is then added to the second image frame.

At step 413, based on the motion related information received in step 404 regarding the segments determined in step 403, the decoder, at function block 311, determines the location of the local residues, if any. At step 414, the local residue locations are ordered in the same manner as by the encoder, using a common, predetermined, canonical ordering scheme. At step 415, the decoder receives encoded local residue information, plus flags denoting the coding method, for each local residue location. At step 416, the decoder decodes the local residue information. At step 417, the decoded local residue information is added to the second frame. At step 418, functional block 318 of decoder 300 receives any special instructions and adds them to the second frame. At step 419, functional block 319 completes reconstruction of the second frame.

At step 420, if there are more frames, the routine continues at step 404.

Alternatively instead of receiving the kinetic information from the segments of the first frame, as described in FIGS. 3 and 4, the decoder uses the structural information from the first frame to determine the best set of basis functions or building block to describe a second frame. This set of basis functions will be the same set as the encoder will determine thus the decoder only needs to receive the coefficients of these basis functions to begin reconstruction.

1.3 Encoder-Decoder

Figure 5A:
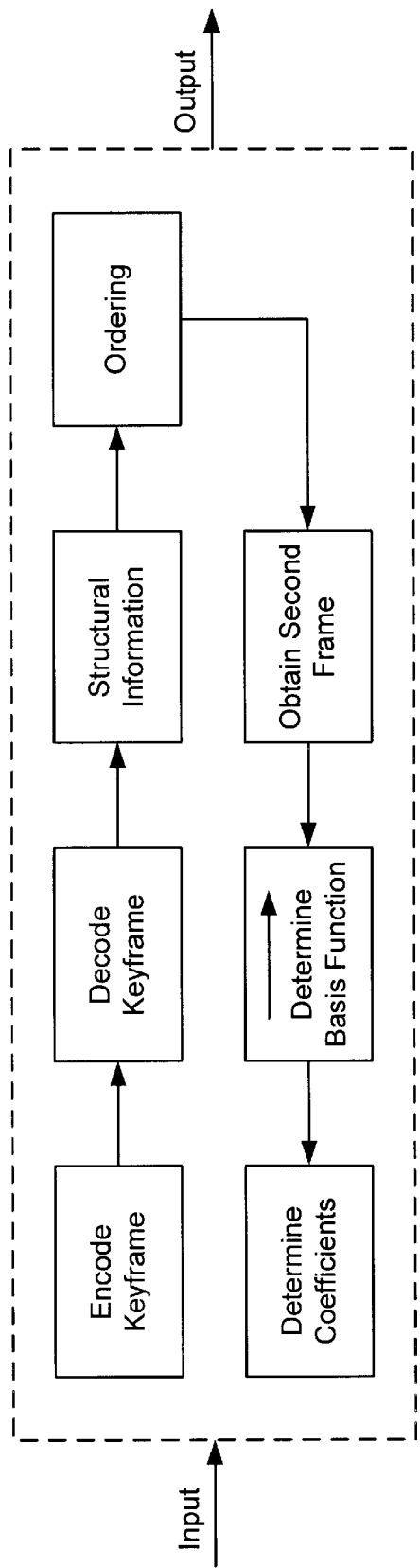
FIG. 5 is a block diagram of a codec according to one embodiment of the invention.
Figure 5B:
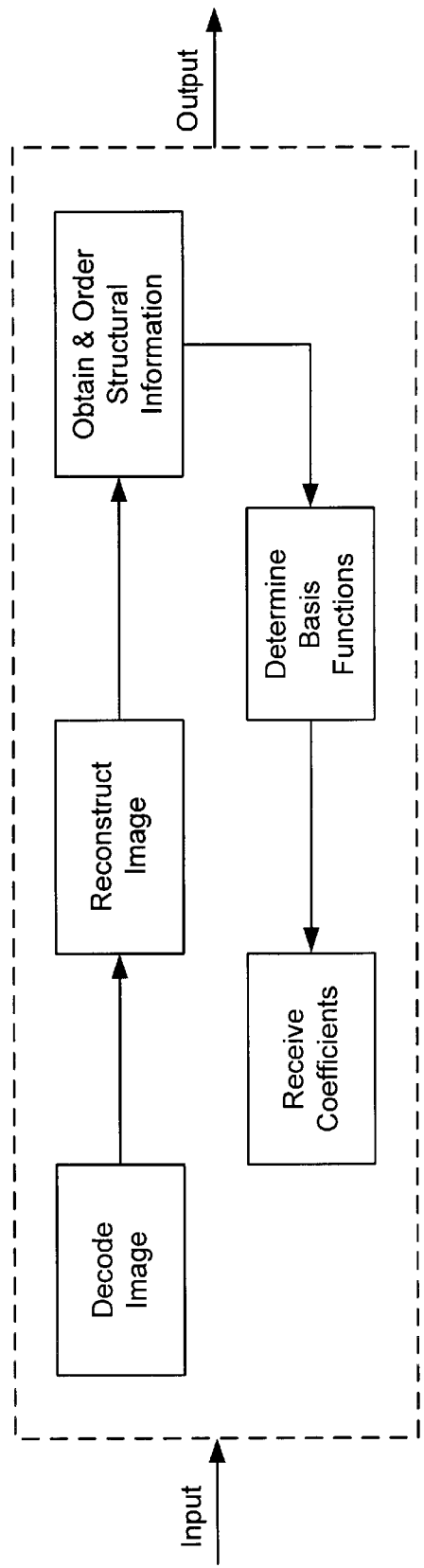

Although the foregoing sections have described the encoder and decoder separately, they are closely related in that the encoder presupposes the existence of, and encodes the images so as to be decoded by, a compatible decoder; and vice-versa. Therefore, it is useful to consider the interrelationship between various steps of FIGS. 2 and 4. Therefore, FIG. 5 illustrates an exemplary encoder-decoder (codec) architecture of the present invention, and FIG. 6 illustrates the operation of the exemplary codec of FIG. 5. At step 601 the encoder obtains, encodes and transmits the reference frame, and the decoder receives the reference frame. At step 602, the reference frame from step 602 is reconstructed by both encoder and decoder. At step 603, identical segments in the reference frame are determined by both encoder and decoder. At step 604, the segments from step 603 are ordered in the same way by both the encoder and decoder.

At step 605, the encoder obtains a new image frame. At step 606, the encoder determines motion related information of the segments from step 603 by motion matching to the frame from step 605. At step 607, the encoder encodes the motion related information.

At step 608, based on the motion related information from step 606, the encoder determines the locations of previously hidden areas (the background residue locations) that are now exposed in the second frame. At step 609, the encoder orders the background residue locations. At step 610, the encoder attempts to mathematically predict the image at the background residue regions. At step 611, the encoder determines if the mathematical prediction was good, based upon the difference between the prediction and the actual background residue information. The encoder will send this difference as computed additional background residue information if necessary.

At step 612, based on the motion related information from step 606, the encoder determines structural information for the local residues. At step 613, structural information for the local residues from step 612 are ordered by the encoder. At step 614, the encoder encodes the local residues.

At step 615, the encoder transmits and the decoder receives a flag identifying whether the frame transmitted and received in step 601 should be represented using the kinetic (motion and residue) information, or should be represented as a key frame. If a key frame, the system returns to step 601. If it is not, the system continues at step 616.

At step 616, the encoder transmits and the decoder receives the segment motion related information from the encoder. At step 617, the decoder determines and orders the background residue locations in the same manner as the encoder did in steps 608 and 609. At step 618, the decoder makes the same prediction that the encoder made in step 610 regarding the background residue. At step 619, the encoder transmits and the decoder receives the additional background residue information, if any, and flags denoting the coding scheme. At step 620, the decoder determines and orders the local residue locations in the same manner as the encoder did in steps 612 and 613. At step 621, the encoder transmits and the decoder receives the local residue information, and flags denoting the coding scheme. At step 622, the encoder transmits and the decoder receives special instructions, if any. At step 632, based upon the kinetic information, both the encoder and decoder identically reconstruct the frame. At step 624, if additional frames are encoded, the frame reconstructed at step 622 becomes the reference frame, and the routine continues at step 605.

Alternatively, the Encoder-Decoder system, instead of utilizing the kinetic information from the segments of the first frame, the encoder-decoder uses the structural information from the first frame to determine the best set of basis functions or building block to describe a second frame. Both the encoder and decoder will independently determine these basis functions, thus only the coefficients of the basis functions needs be transmitted.

2. Encoder

Although the operation of the encoder has been described generally above, it will also be instructive to illustrate its operation with respect to some particular image examples, as well as to elaborate on particular steps of the encoding process.

2.1 Reference Frame Transmission

Figure 7:
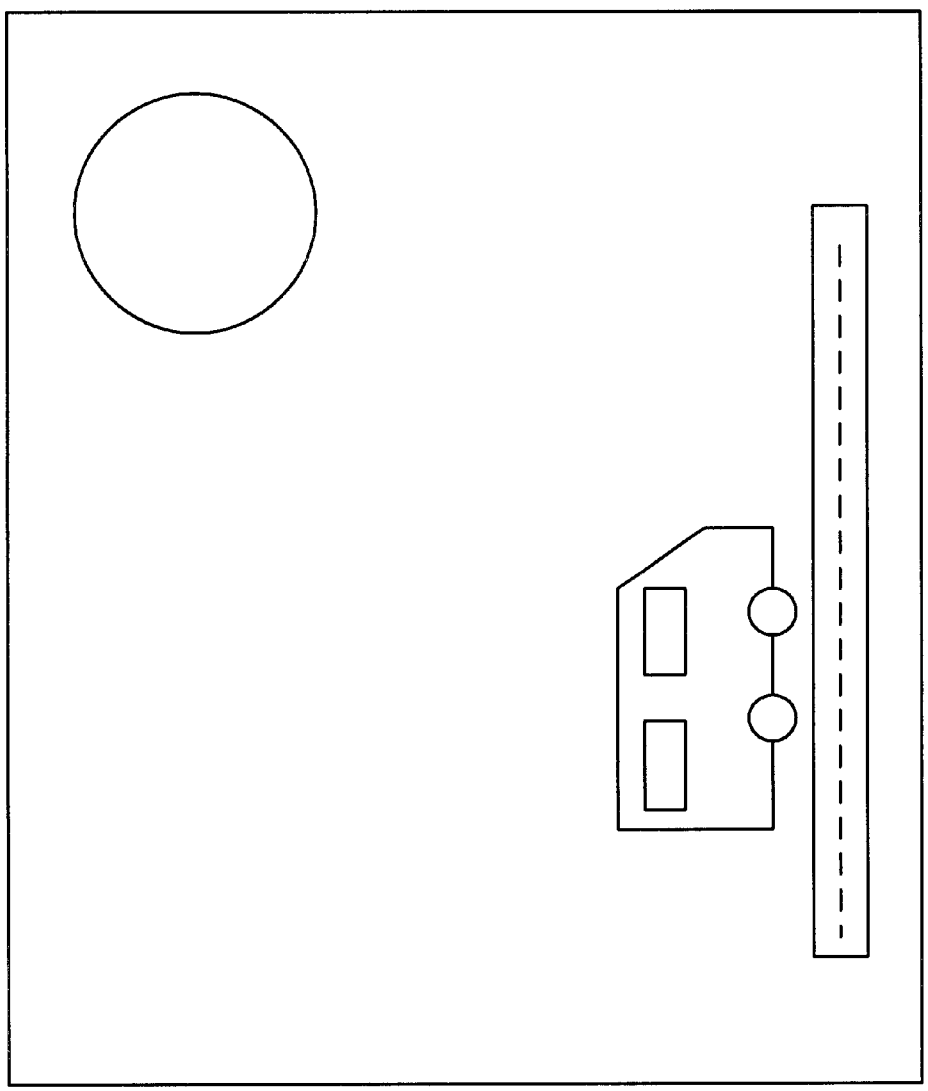
FIG. 7 is an illustration of a reference frame.

Referring to FIG. 7, the encoder receives the reference frame, in this case, a picture of an automobile moving left to right with a sun in the background. The reference frame generally refers to a frame in relation to which any other frame is described. In the first pass through the encoder cycle, the reference frame will generally be a key frame. Alternatively, upon subsequent passes, the reference frame may be a previously encoded non-key frame.

Figure 8:
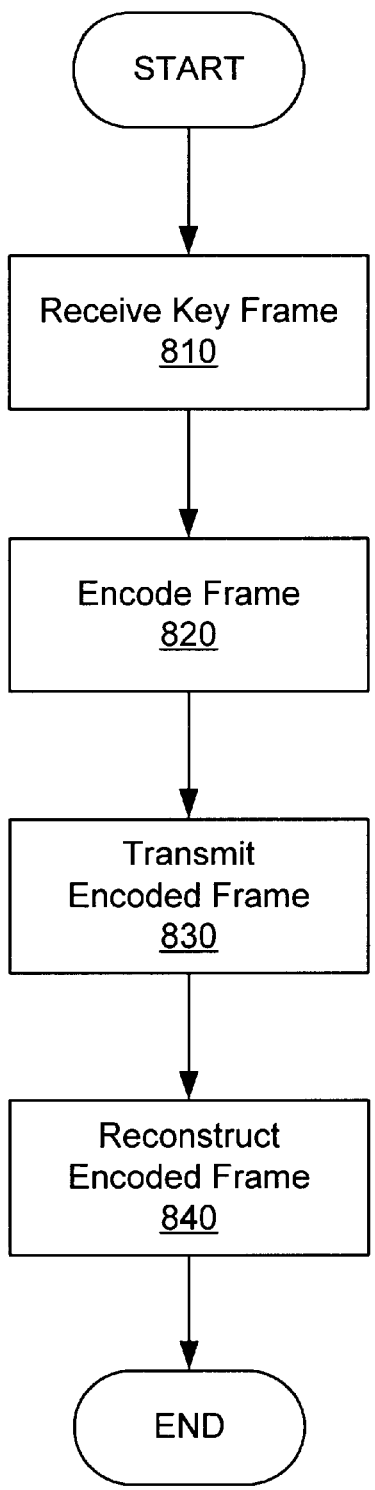
FIG. 8 is a flow chart illustrating the procedure by which an encoder initially processes a reference frame according to one embodiment of the invention.

FIG. 8 is a flow diagram illustrating the procedure by which the encoder initially processes the key frame. At step 810, the encoder receives the frame illustrated in FIG. 7. At step 820, the encoder encodes the frame. At step 830, the encoder transmits the encoded frame to a receptor (e.g., to a decoder or to a storage medium for subsequent decoding). The encoder reconstructs the encoded frame at step 840.

2.2 Segmentation

Figure 10:
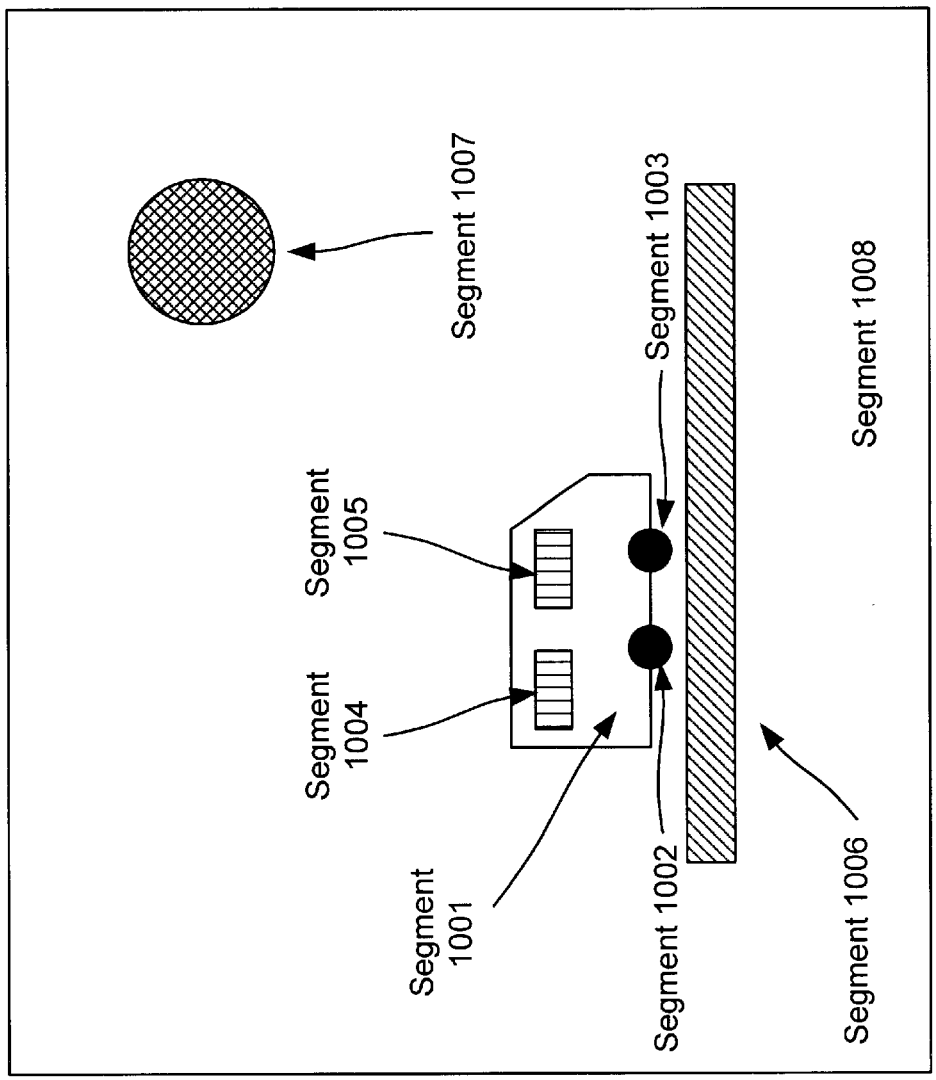
FIG. 10 is an illustration of a segmentation according to one embodiment of the invention.

Segmentation is the process by which a digital image is subdivided into its component parts, i.e., segments, where each segment represents an area bounded by a radical or sharp change in values within the image as shown in FIG. 10.

Those skilled in the art of computer vision will be aware that segmentation can be done in a plurality of ways. For example, one such way is the so-called "watershed method" which is described at www.csu.edu.au/ci/vol3/csc96f/csc96f.html. This and other segmentation techniques usable with the invention are known to those skilled in the art, and need not be described in detail here.

Figure 9:
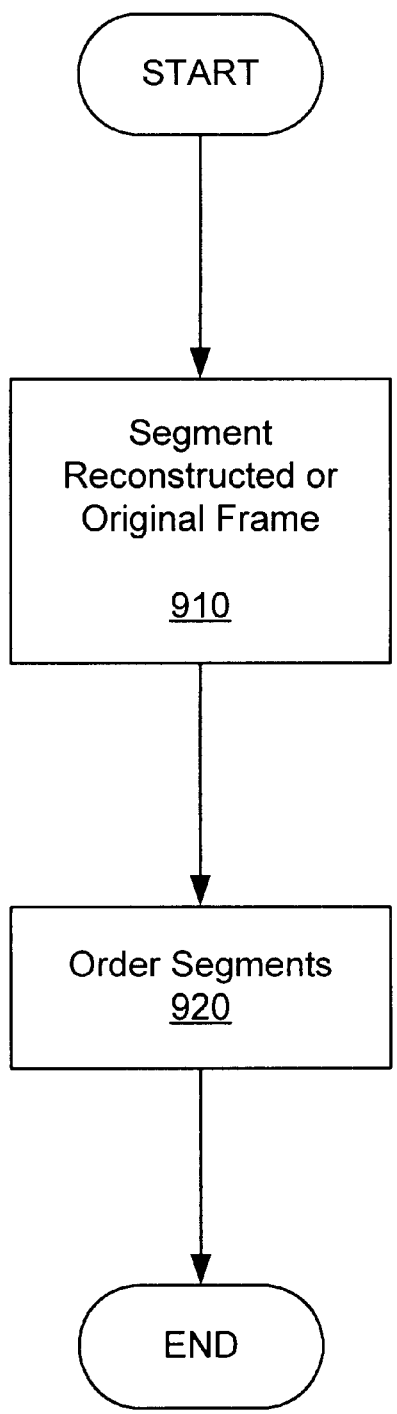
FIG. 9 is a flow chart illustrating the procedure by which an encoder segments a reconstructed reference frame according to one embodiment of the invention.

Referring now to FIG. 9, at step 910, the encoder segments the reconstructed reference frame to determine the inherent structural features of the image. Alternatively, at step 910, the encoder segments the original image frame for the same purpose. The encoder determines that the segments of FIG. 7 are the car, the rear wheel, the front wheel, the rear window, the front window, the street, the sun, and the background. Alternatively, at step 910, the encoder segments both the original frame and the reconstructed frame and determines the difference in segmentation between the two frames. In this case the encoder transmits this difference to decoder as part of the motion related information. This difference is referred herein as the segmentation augmentation.

At step 920, the encoder orders the segments based upon any predetermined criteria and marks the segments 1001 through 1008, respectively, as seen in FIG. 10.

Segmentation permits the encoder to perform efficient motion matching, Z-ordering, motion prediction, and efficient residue coding as explained further in this description.

2.3 Kinetic Information

Once segmentation has been accomplished, the encoder determines and encodes the kinetic information regarding the evolution of each segment from frame to frame. The kinetic information includes a description of the motion related information and residue information. Motion related information can consist of motion data for segments, Bordering information, segmentation augmentation if necessary, etc. Residue information consists of information in previously occluded areas and/or inexact matches and appearance of new information, and portion of the segment evolution that is not captured by motion per se etc.)

2.3.1 Matching and Segment Motion Data

The motion part of the kinetic information is determined through a process known as motion matching. Motion matching is the procedure of matching similar regions, often segments, from one frame to another frame, At each pixel within a digital image frame, an image is represented by numerical value. Matching occurs when a region in one frame has identical or sufficiently similar pixel values with a region in another frame.

For example, a segment may be considered matched with another segment in a different frame if the first segment, when appropriately moved and placed over the second segment, and the average of the absolute values of the differences in pixel values is computed, this average lies below a pre-determined threshold. While the average of the absolute values of the pixel differences is often used because it is a simple measure of similarity, any number of other such measures could suffice. Such measures that may be used for determining a match would be clear to those skilled in the art, and need not be described in further detail here.

FIG. 11 illustrates an example of motion matching of a grey hot air balloon between frames 1110 and 1120. In frame 1110, we have grey hot air balloon, 1111. In frame 1120, we have white ball, 1122, next to the grey hot air balloon 1121, which is slightly smaller and twisted than grey hot air balloon 1120. Moving the hot air balloon 1111 over white ball 1122, subtraction of the pixel values contained within the white ball, 1122 in frame 1120 from the pixel values contained within grey hot air balloon, 1121 in frame 1110 yields a set of non-zero differences. Thus, the grey hot air balloon and white ball will not be matched. However, moving the grey hot air balloon 1110 over grey hot air balloon 1120, subtraction of grey hot air balloon, 1121 in frame 1120 from grey hot air balloon, 1111 in frame 1110 yields a set of mostly zero and close to zero values, except for the small region near the edges and basket. Thus, the two grey hot air balloons would be considered matched.

2.3.2 Grouping

The motion related information transmitted to the decoder can be reduced if related segments can be considered as single groups so that the encoder only needs to transmit motion related information for the group along with any further refinements for individual segments, if any, when necessary. For instance, for segment motion data, the encoder only needs to transmit a representative or characteristic motion vector to the decoder along with motion vector offsets, if any, to represent the individual motion of each segment within the group. The characteristic motion vector can be of virtually any type; for example, that of a single, base segment, or the average for the entire group.

Grouping is possible if there is previous kinetic information about the segments or if there is multi-scale information about the segments. Multi-scaling will be explained in Section 2.3.4, below. Without any further limitation in this specific embodiment of this invention, only motion vector grouping will be described in further detail.

Figure 12:
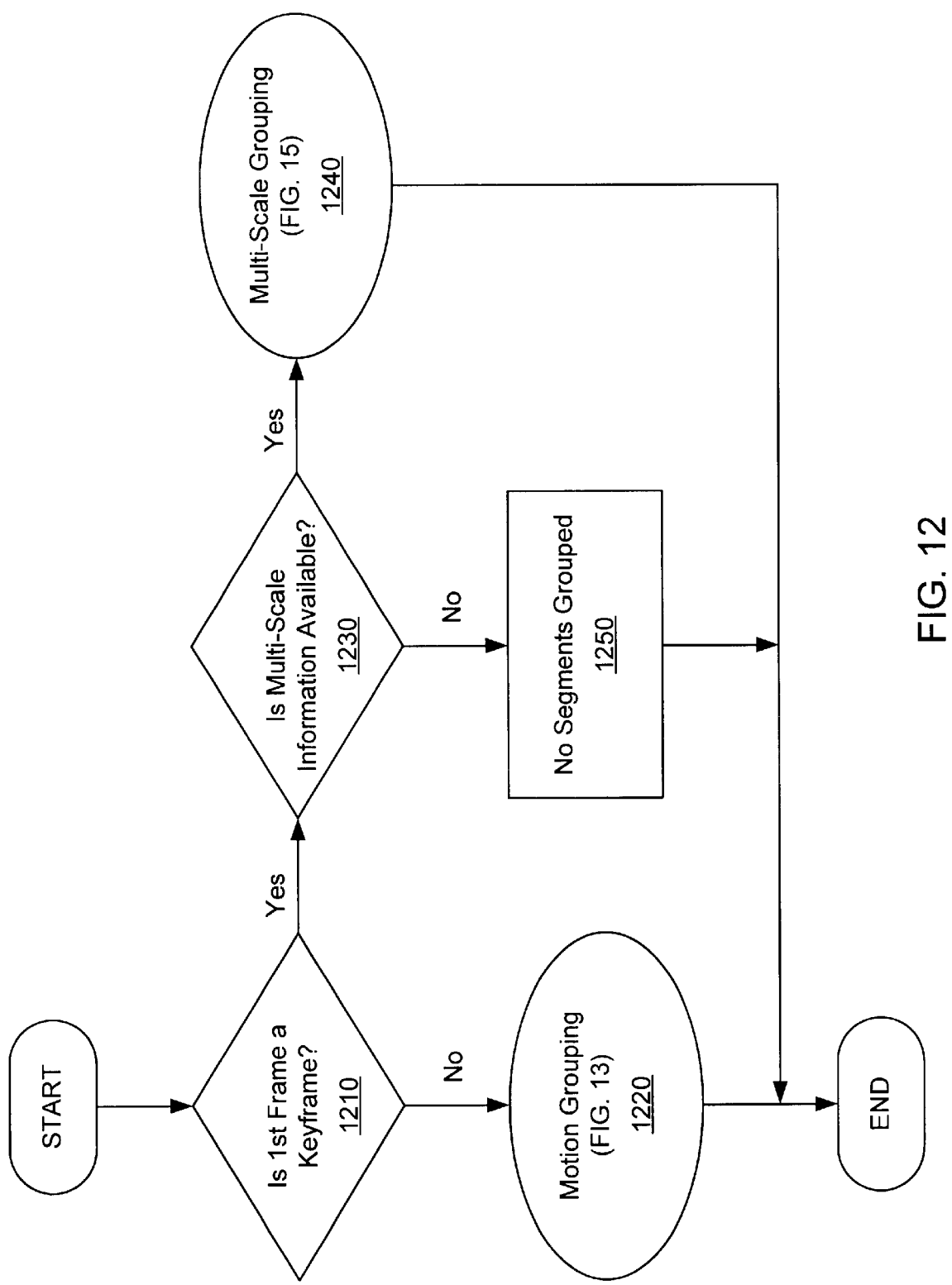
FIG. 12 is a flow chart illustrating the procedure by which an encoder determines whether grouping is performed according to one embodiment of the invention.

Referring to FIG. 12, at step 1210, the encoder determines if the first frame is a key frame, i.e., not described in relation to other frames. If the first frame is a keyframe, the motion grouping routine will use multi-scaling information, if possible, to group segments. If the first frame is not a key frame, then there will be some previous motion data usable to group segments. Therefore, if the first frame is not a key frame, at step 1220 the motion grouping routine, described below in Section 2.3.2, is executed. However, the use of previous motion data does not preclude the use of multi-scaling for additional grouping.

However, if the first frame is a key frame, then at step 1230 the encoder determines if there is any multi-scale information available. If there is, then at step 1240 the multi-scaling routine, described below in Section 2.3.4, is executed. Otherwise, at step 1250, the encoder does not group any segments.

2.3.2.1 Motion Based Grouping

Figure 13:
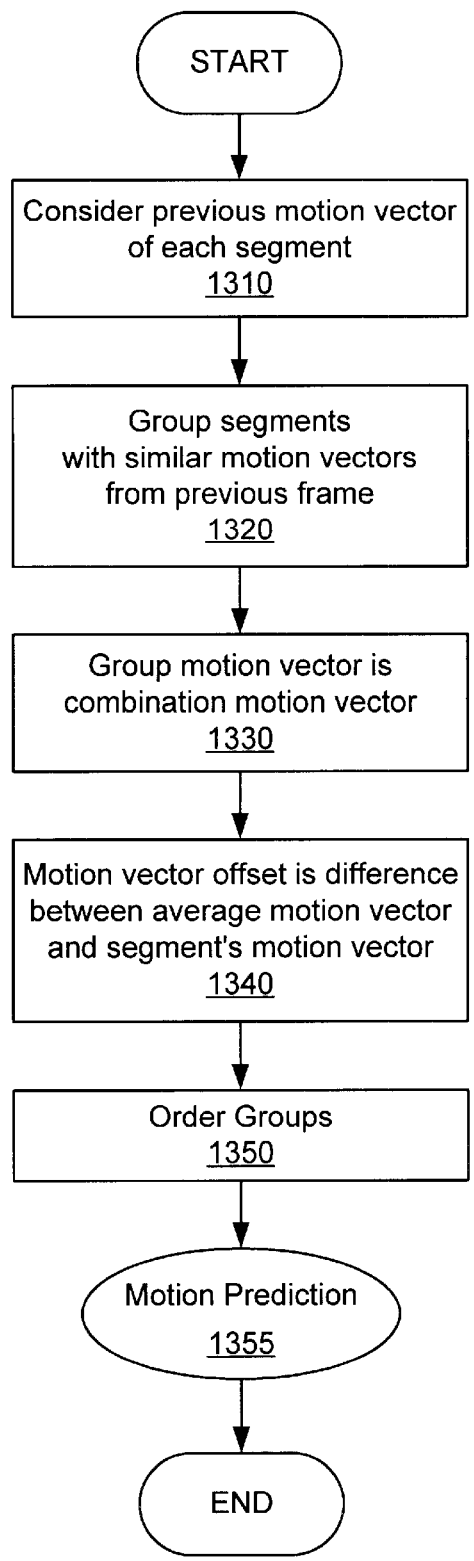
FIG. 13 is a flow chart illustrating motion vector grouping according to one embodiment of the invention.

Motion based grouping only occurs when there is previous motion related information so that the encoder can determine which segments to associate. The decoder will also group the segments in the same or similar fashion as the encoder. Motion based grouping begins at step 1310 in FIG. 13, where the previous motion data of each segment is considered. Segments which exhibit similar motion vectors are grouped together at step 1320.

2.3.2.2 Multi-Scale Grouping

Multi-scaling grouping is an alternative to grouping segments by previous motion. Moreover, multi-scaling can also be used in conjunction with motion grouping. Multi-scaling is the process of creating lower resolution versions of an image. An example of creating multiple scales is through the repeated application of a smoothing function. The result of creating lower resolution images is that as the resolution decreases, only larger, more dominant features remain visible. Thus for example, the stitching on a football may become invisible at lower resolutions, yet the football itself remains discernible.

Figure 15:
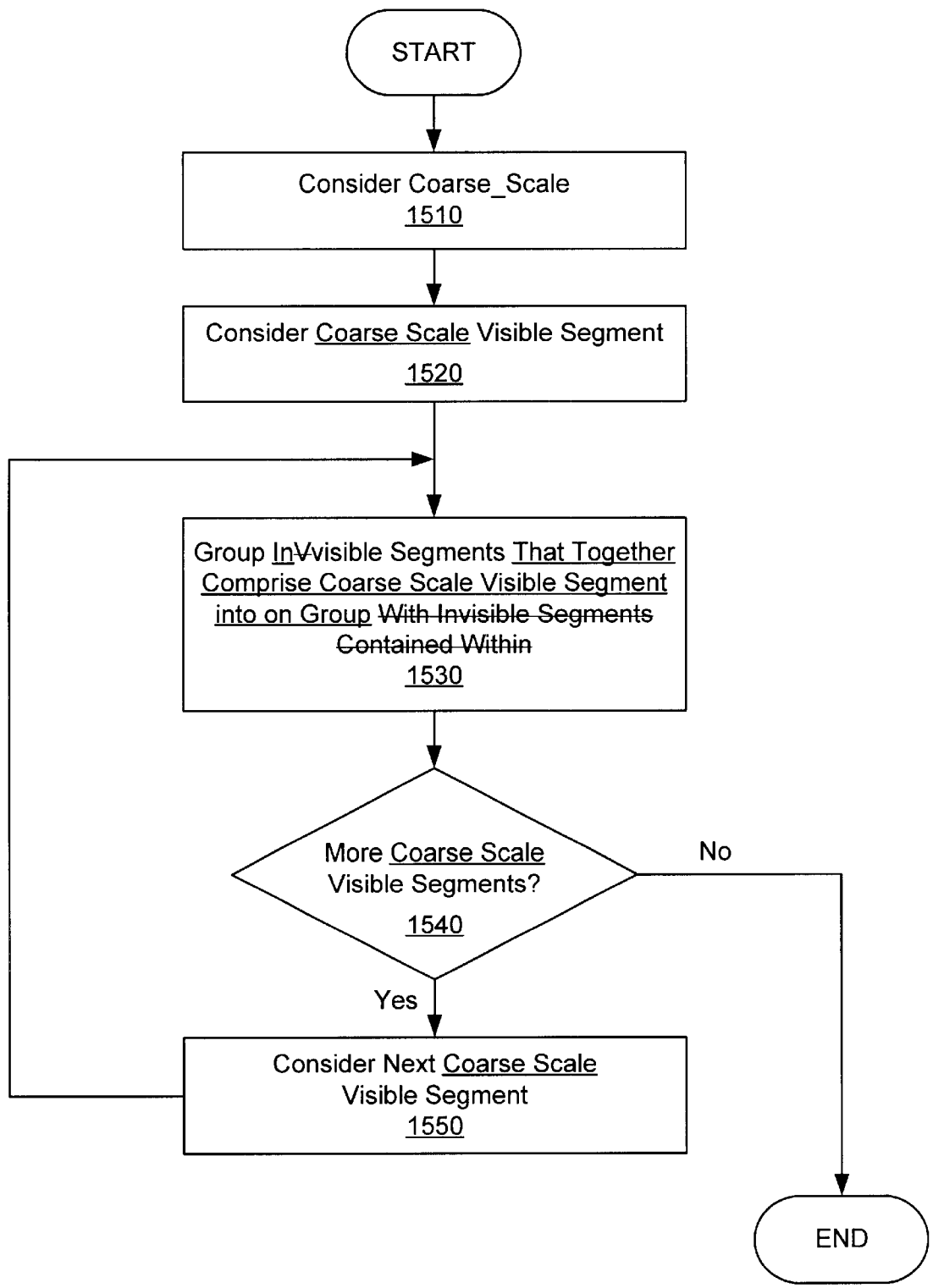
FIG. 15 is a flow chart illustrating multi-scale grouping according to one embodiment of the invention.

An example of the multi-scale processes is as follows. Referring to FIG. 15, at step 1510, the encoder considers say the coarsest image scale (i.e., lowest resolution) for the frame, and at step 1520, determines which segments have remained visible. In such a coarse image scale usually only the largest, most dominant features (usually bounded by the outlines of major objects) remain visible; while smaller, less dominant segments (usually corresponding to features that make up major objects) are no longer discernible. At step 1530, segments which are invisible in the coarsest scale and which together comprise a given visible segment are associated with one group. This is because the smaller, now invisible segments are often share a relationship with the larger object and will likely have similar kinetic information. Thus, a coarser scale representation of an image may be considered to represent a cluster of finer scales. A decision is made at step 1540. If there are more visible segments, at step 1550, the encoder considers the next segment and continues at step 1530. Otherwise, the multi-scaling grouping process ends.

The foregoing exemplary embodiment uses the coarsest image scale which, of course, depends on the particular range of multi-scaling used for a particular image. Obviously, in other exemplary embodiments, one or more other scales may also be used.

The decoder will perform grouping in the same or similar manner as will the encoder.

2.3.3 Motion Prediction

Figure 14:
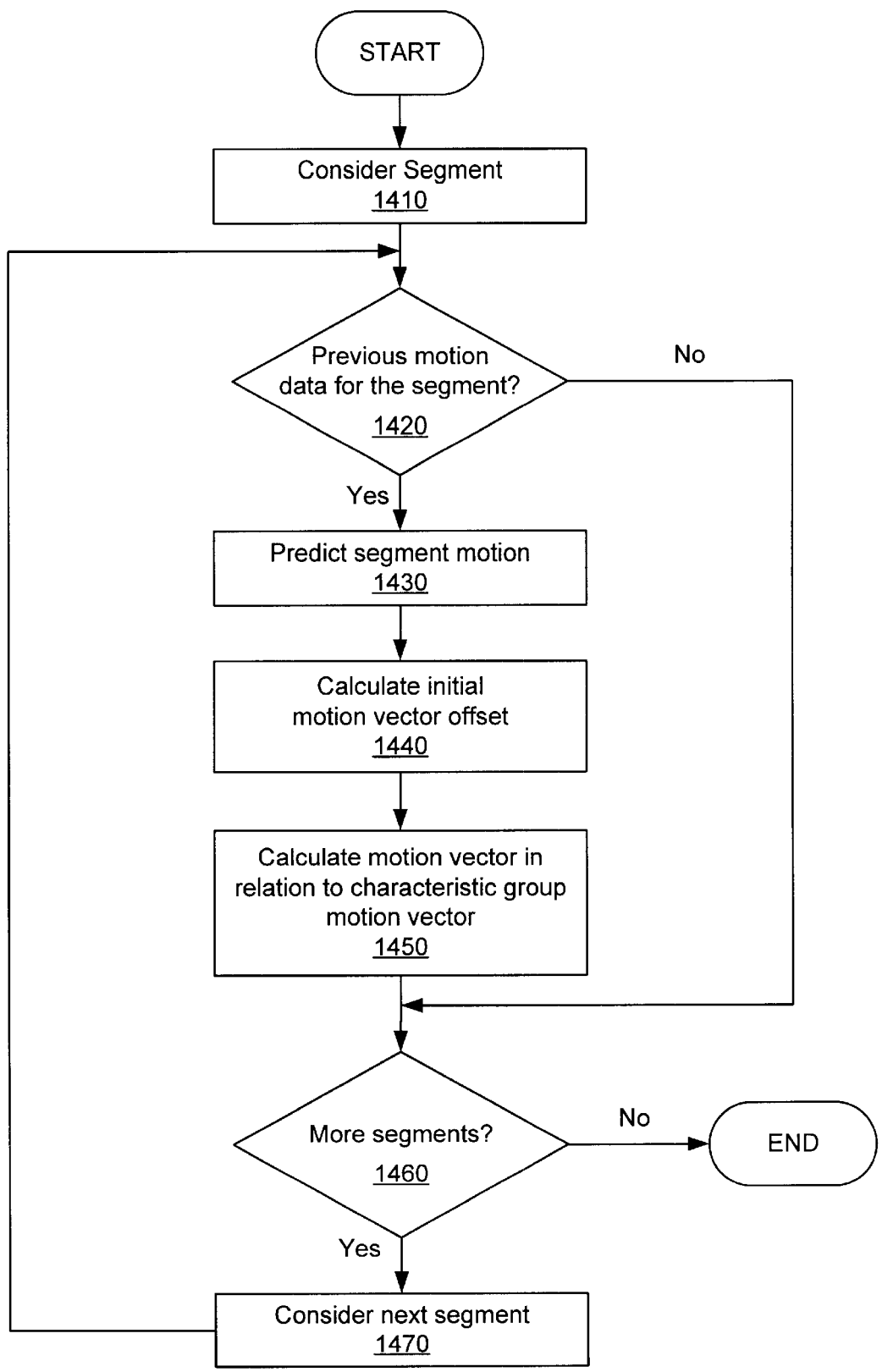
FIG. 14 is a flow chart illustrating motion prediction according to one embodiment of the invention.

Referring to FIG. 14, at step 1410, the encoder considers a segment. At step 1420, the encoder determines if there is previous motion related information for the segment so that its motion can be predicted. The decoder will predict the motion of the segments or group of segments in the same or similar manner as will the encoder. If there isn't any previous motion related information, the encoder continues at step 1460 as described below.

If there is previous motion related information, the encoder predicts the motion of the segment at step 1430 and compares the prediction to the actual motion of the segment. A motion vector offset is initially calculated at step 1440 as the difference between the actual and predicted motion vectors. At step 1450 the encoder may further represent the motion vector offset as the difference between it and the relevant characteristic (or group) motion vector.

At step 1460, the encoder determines if there are any more segments, if so, then at step 1470, the encoder considers the next segment and continues at step 1420. Otherwise the prediction routine ends.

2.3.2.1.1 Motion Related Information Coding

Once grouping and prediction have occurred, they may be leveraged to reduce the overhead in encoding much of motion relation information. taken of For example, segmentation augmentation may be described more efficiently with respect to groups in place of individual segments. In the case motion vector coding. At step 1330, the motion vector for the group is obtained by computing a characteristic representative for all the motion vectors within the group. Thus, for each segment within the group, only the motion vector difference, i.e., the difference between the segment's motion vector, if any, and the characteristic (or group) motion vector will eventually be transmitted (see step 1340). One example of a characteristic motion vector is an average motion vector. Further improvement in motion vector encoding may be achieved through the use of motion prediction and only encoding motion offsets with respect to predicted motion.

2.3.4 Z-Ordering

Z-ordering refers to the relative depth position within the image frame that each image occupies. The encoder determines and transmits the z-ordering information so that as the structural information changes from one frame to another, the depth information contained within the structural information is preserved.

2.3.5 Residue Coding

Residue information consists of information in previously occluded areas and/or inexact matches and appearance of new information, and portion of the segment evolution that is not captured by motion per se etc.)

2.3.5.1 Background Residue

Figure 16:
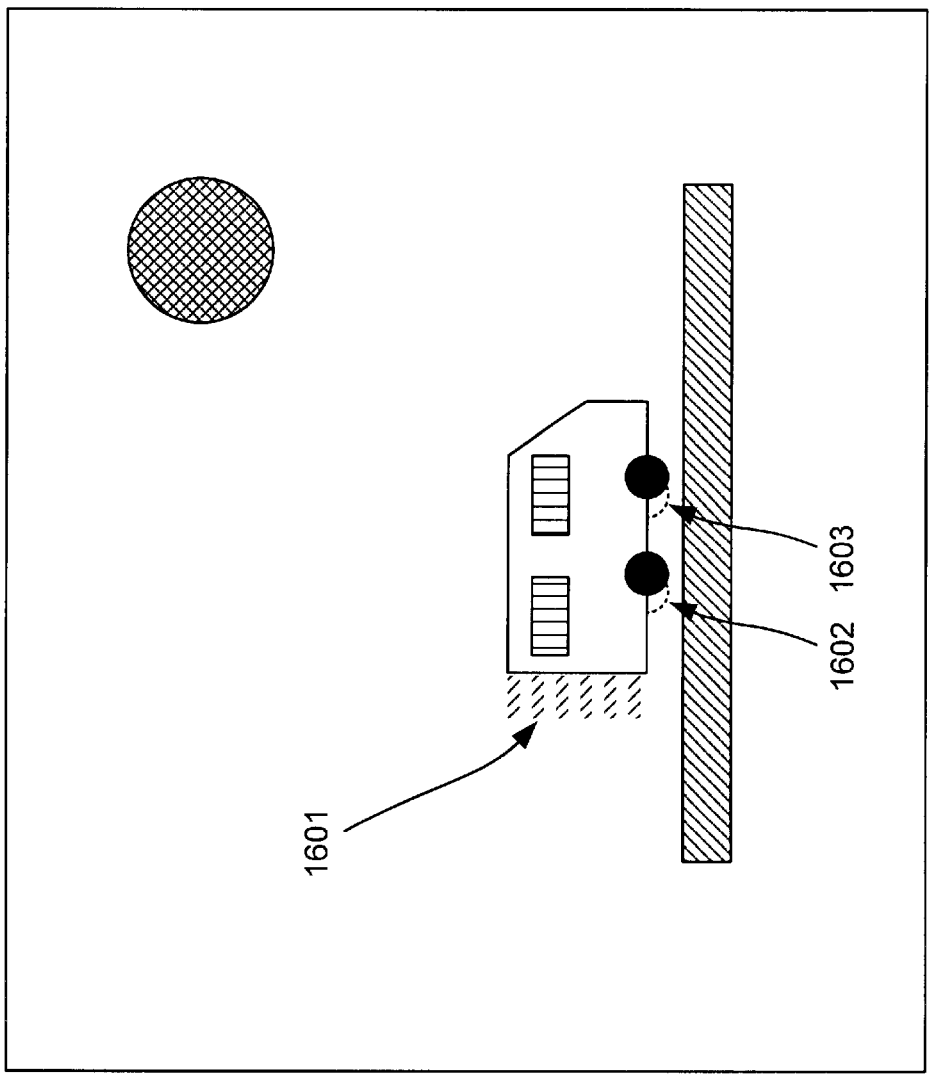
FIG. 16 is an illustration of a previously hidden areas becoming visible due to segment motion.

As shown in FIG. 16, as the segment moves, previously hidden or obstructed areas may become visible for the first time. In FIG. 16, three regions become visible as the car moves. They are the area behind the back of the car and the two areas behind the wheels. These are marked as regions 1601 through 1603, respectively.

Figure 17:
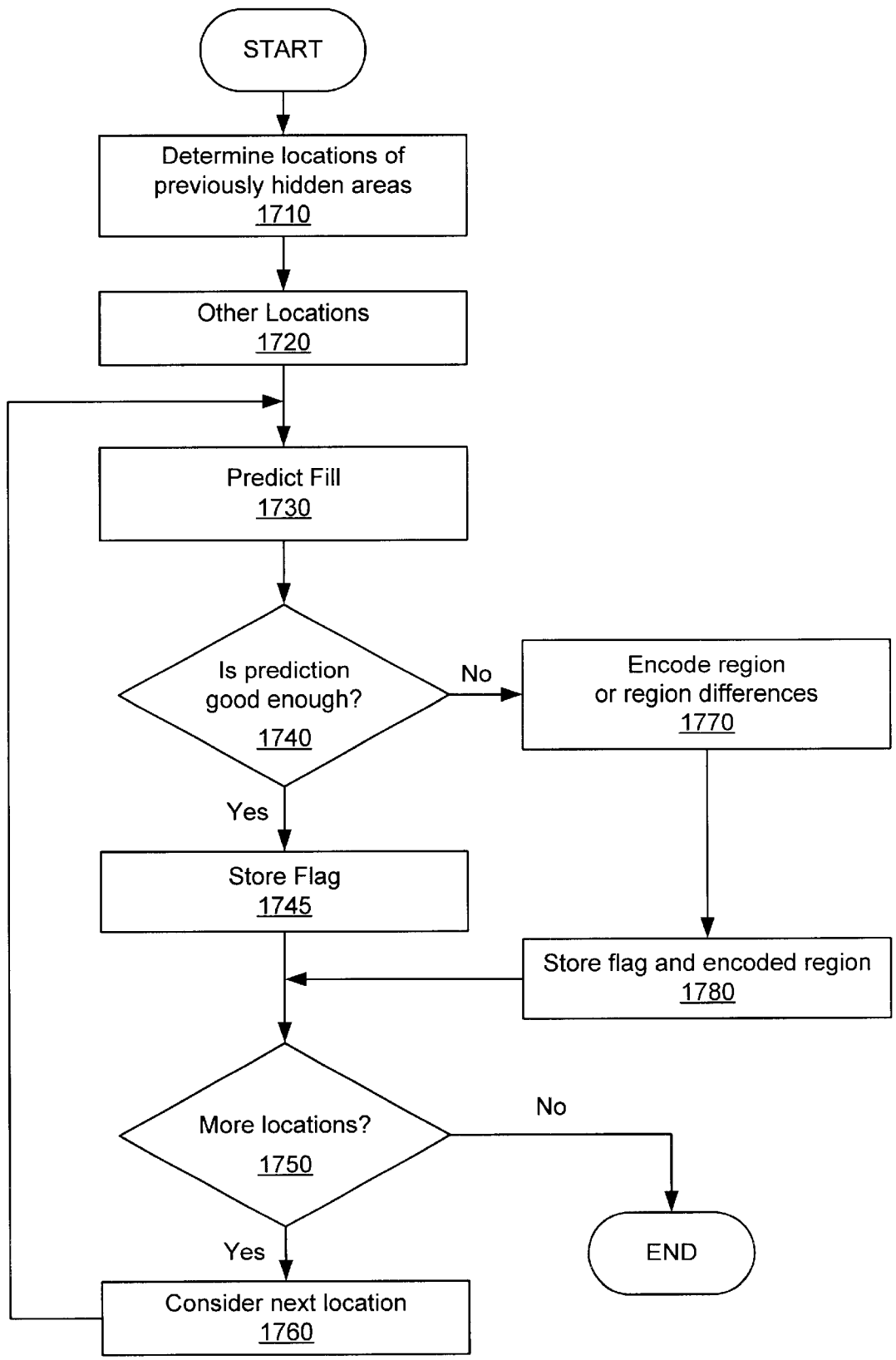
FIG. 17 is a flow chart of illustrated a procedure of predicting the structure of previously hidden information according to one embodiment of the invention.

Referring to FIG. 17, at step 1710, the encoder determines where the previously hidden image regions occur. At step 1720, the encoder orders the regions using a predetermined ordering system. At step 1730, using information corresponding to area(s) surrounding a region, the encoder makes a mathematical prediction as to the structure of the previously hidden region. Yet, the encoder also knows precisely what images were revealed at the region. Thus, at step 1740, the encoder considers the region and determines if the mathematical prediction was sufficient by comparing the predicted image with the actual image. If the prediction was not close, then, at step 1770, the encoder will encode the region or the difference and, at step 1780, store the encoded information with a flag denoting the coding mechanism. Otherwise, if the prediction was close enough, the encoder stores a flag denoting that fact at step 1745.

At step 1750, the encoder determines if there are any more newly unobstructed regions. If so, the next region is considered and the routine continues at step 1760, else the routine ends.

2.3.5.2 Local Residues

Local residue information consists of information from inexact matches and appearance of new information etc.) For example, in FIG. 18, the car and sun appear smaller in frame 1802 than in frame 1801. The structure of the residue will depend on how different the new segments are from the previous segments. It may be a well-defined region, or set of regions, or it may be patchy. Different types of coding methods are ideal for different types of local residue. Since the decoder knows the segment motion, it knows where most of the local residues will be located. The encoder uses the decoder's knowledge of structural information including locations of segment boundaries can be taken into consideration to improve the efficiency of local residue coding.

Figure 19:
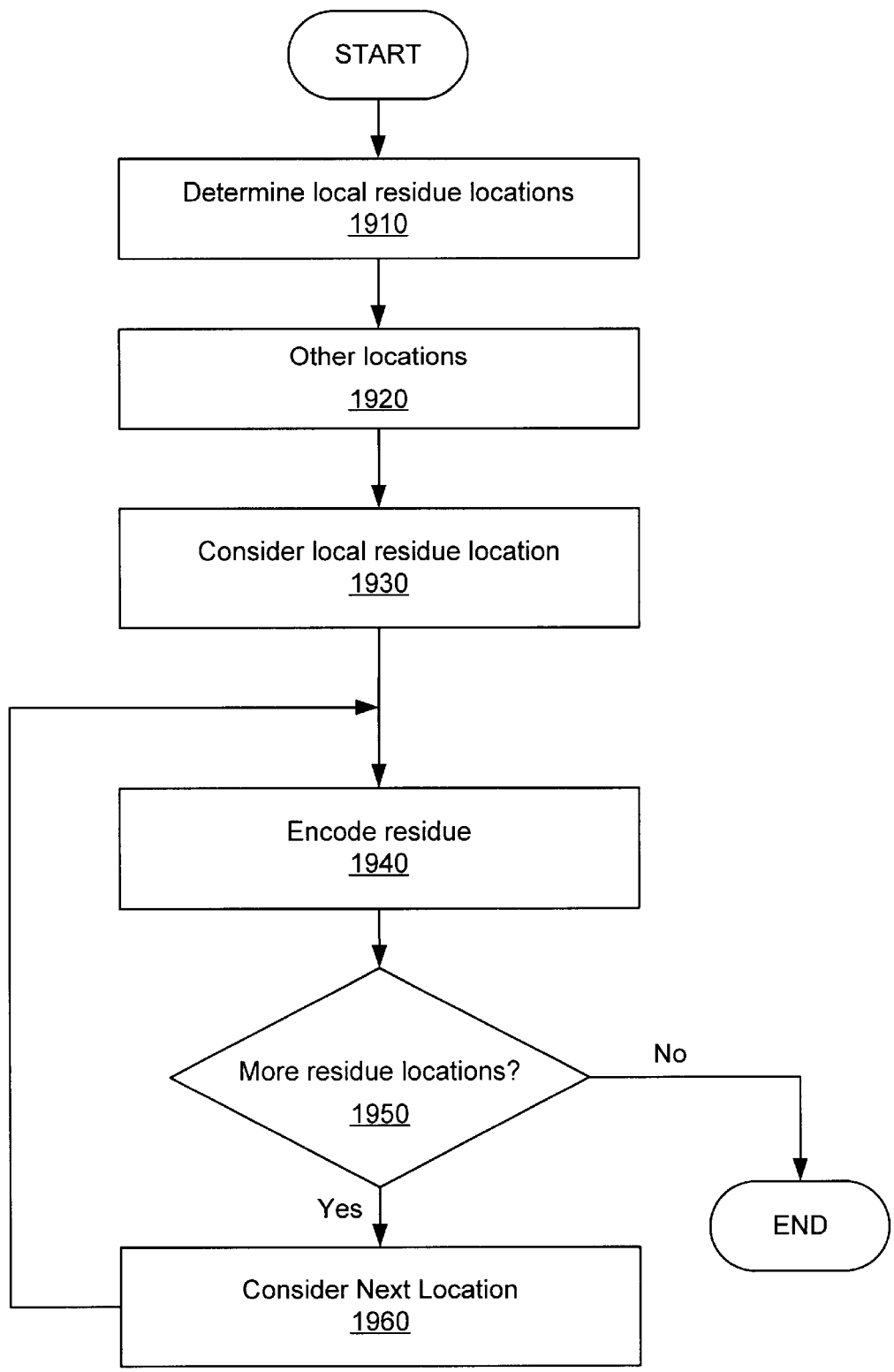
FIG. 19 is a flow chart illustrating the encoding of local residues according to one embodiment of the invention.

Referring to FIG. 19, at step 1910, the encoder determines the locations of the local residues. At step 1920, the encoder orders the regions where the local residues occur using a pre-determined ordering scheme. At step 1930, the encoder considers the first local residue, and makes a decision as the most efficient method of coding it, then encodes it at step 1940. At step 1950, the encoder stores the coded residue and a flag denoting the coding mechanism. If there are more local residue locations at step 1960, then, at step 1970 the next local residue location is considered and the routine continues at step 1940. Otherwise the routine ends.

2.3.6 Special Instructions

The encoder embeds commands and instructions regarding each segment into the bitstream as necessary. Examples of these commands include, but are not limited to, getting static web pages, obtaining another video bitstream, waiting for text, etc.

Figure 20:
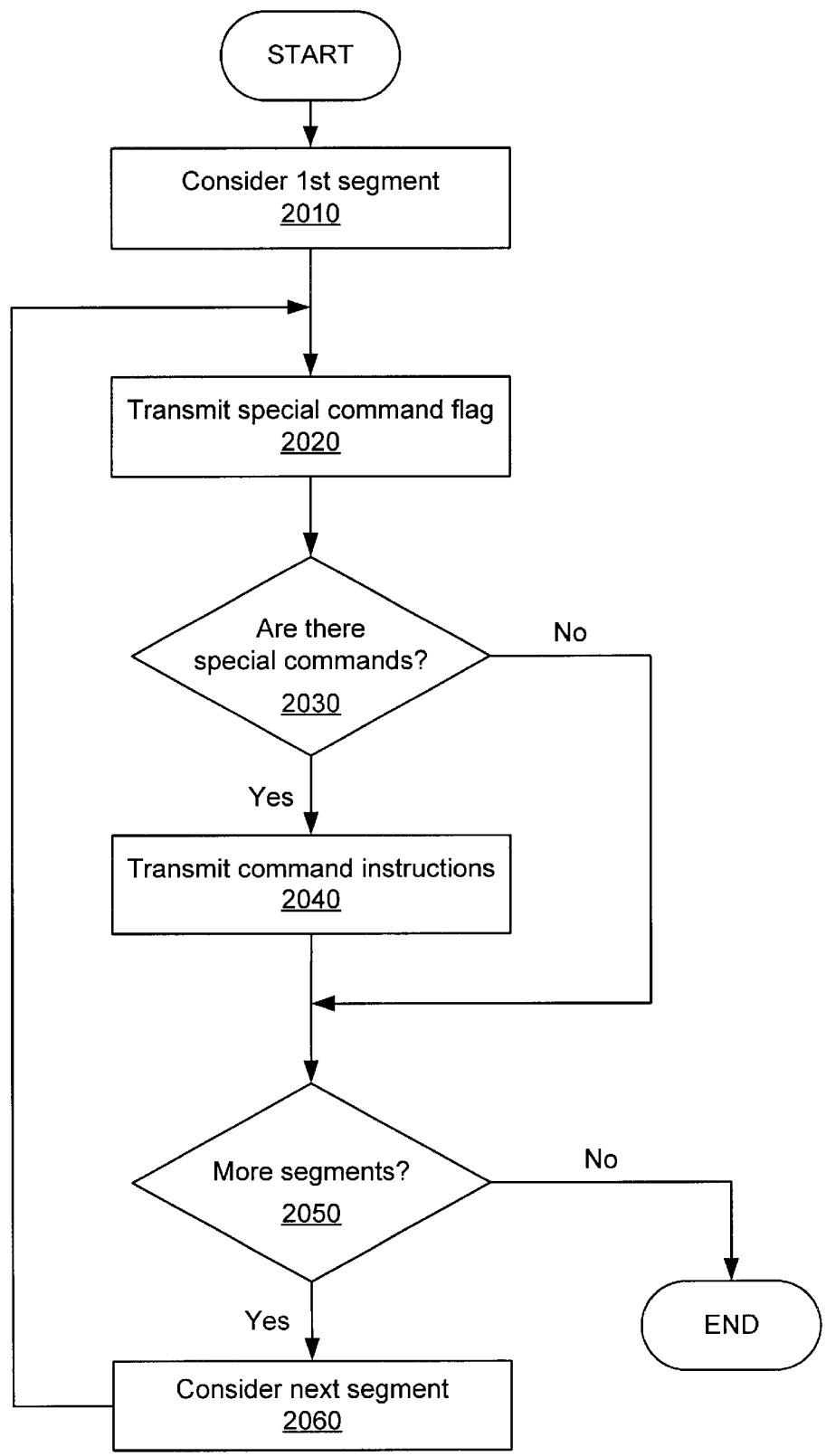
FIG. 20 is a flow chart illustrating a procedure for embedding command according to one embodiment of the invention.

The encoder can embed these commands at any point within the bitstream subsequent to the encoder determining the segments and can take advantage of it knowledge of what the encoder can determine. FIG. 20 is an example of one point where the commands are embedded within the data stream.

Referring to FIG. 20, at step 2010, the encoder considers the first segment. At step 2020, the encoder transmits a special instruction flag. At step 2030, the encoder determines if there are any special instructions for the segment. If yes, then at step 2040, the instructions are transmitted to the decoder and at step 2050 the encoder determines if there are any more segments. If, at step 1730, there are no special instructions associated with the segment, the encoder proceeds directly to step 2050. If, at step 2050, there are more segments, at step 2060, the encoder considers the next segment at step 2060 and continues to step 2020; otherwise the routine ends.

2.4 Transmission

Figure 21:
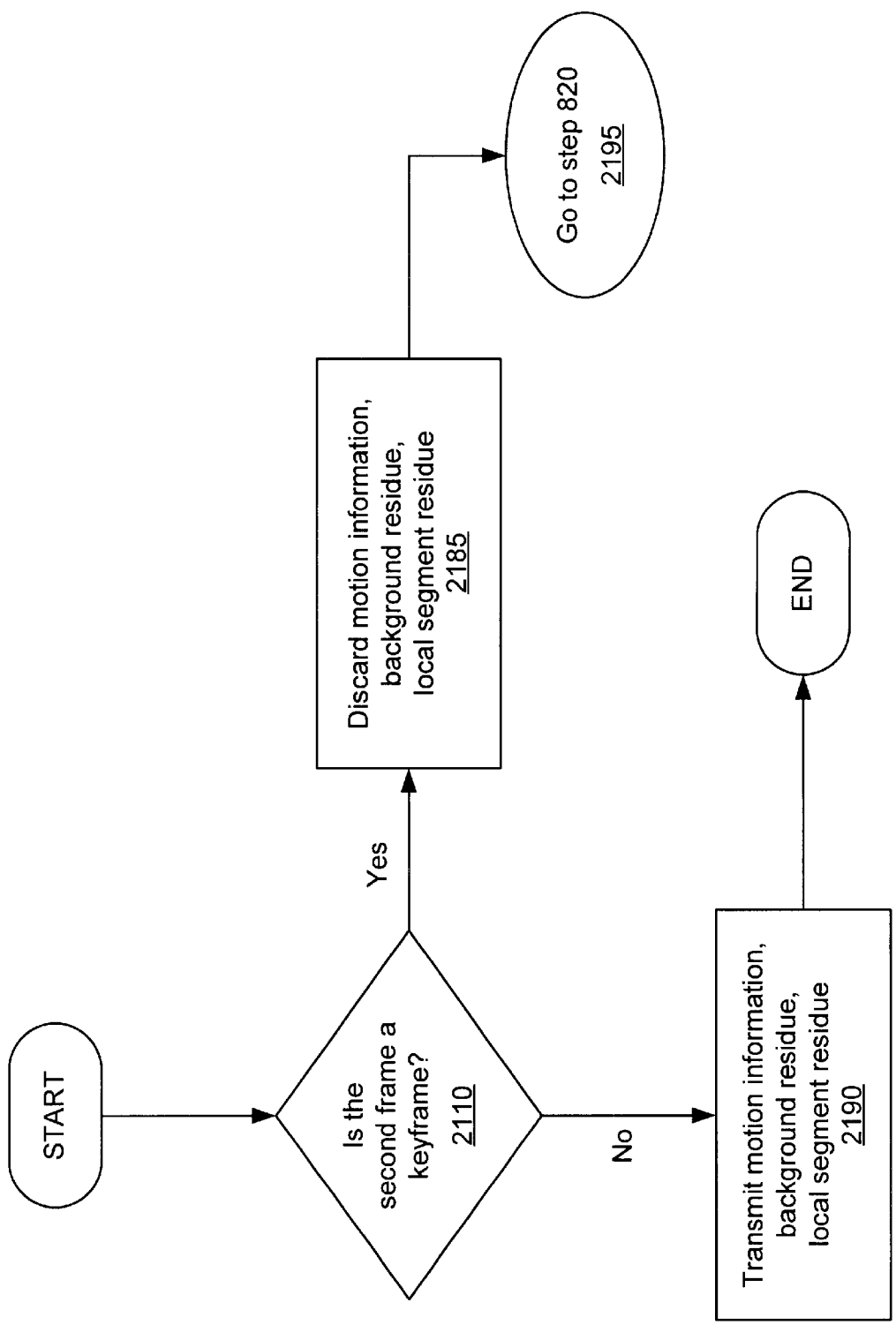
FIG. 21 is a flow chart illustrating a procedure for transmitting a frame according to one embodiment of the invention.

Following the determination and encoding of the kinetic (motion and residue) information, a decision concerning the transmission of frame information is made. Referring to FIG. 21, at step 2110, if the image can be reasonably reconstructed primarily from the motion related information with assistance from the residue information, then, at step 2190, the encoder will transmit the kinetic information for the frame. Otherwise, the frame is coded as a key frame, and at step 2185, the kinetic information is discarded.

2.5 Alternative

Alternatively, the encoder, instead of utilizing the kinetic information from the segments of the first frame, uses the structural information including for example the segmentation from the first frame to create and order the best set of basis functions or building blocks to describe a second frame. This may be referred to as an adaptive coding or adaptive transform coding method based upon the encoder's knowledge of the decoder's ability to create an appropriate set of basis functions or building blocks based upon structural information available to the decoder. Both the encoder and the decoder will independently determine these basis functions, thus only the coefficients of the basis functions need be transmitted.

3 Decoder 3.1 Reference Frame Reception

Figure 22:
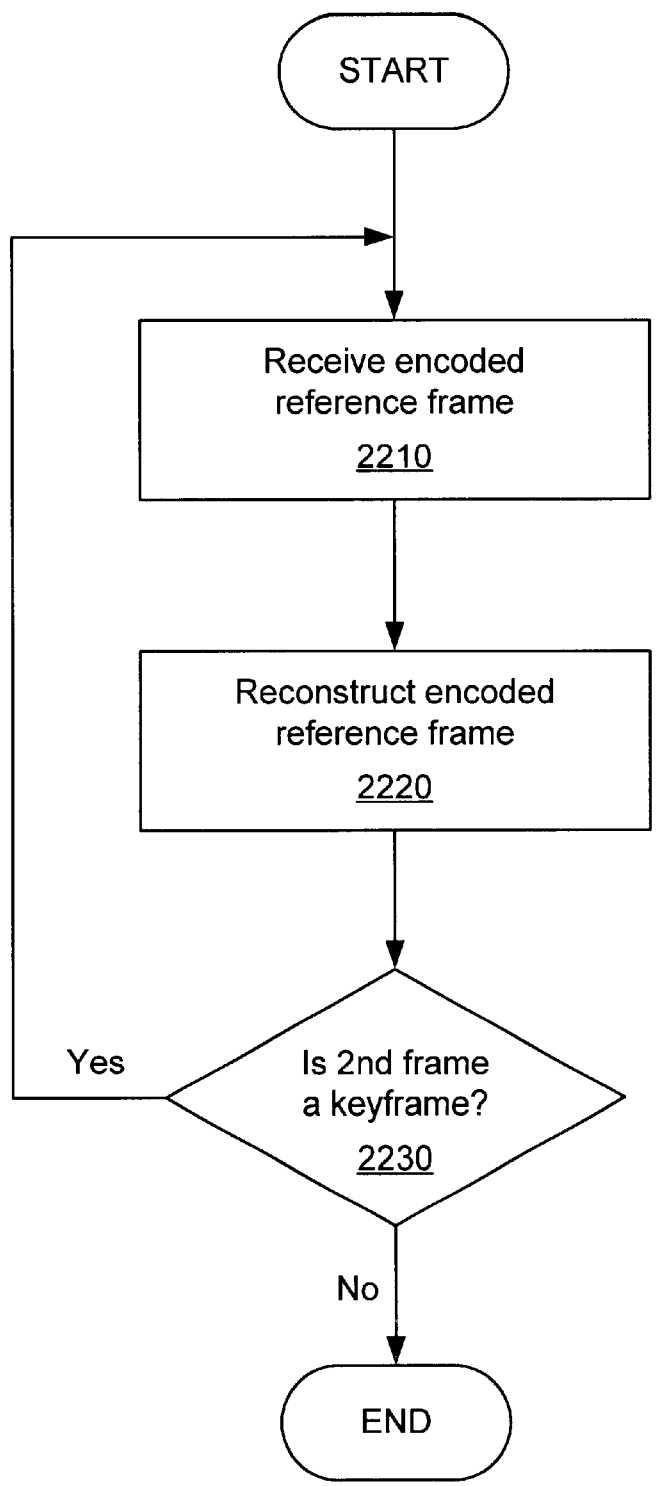
FIG. 22 is a flow chart illustrating the process by which a decoder receives a reference frame according to one embodiment of the invention.

FIG. 22 illustrates the process by which the decoder receives a reference frame. A reference frame, generally, is a frame in relation to which other, subsequent frames are described. At step 2210, the encoder receives the encoded reference frame. At step 2220, the decoder reconstructs the encoded reference frame.

At step 2230, the decoder receives a key frame flag. This flag denotes whether the next frame is a key frame or can it be reconstructed from the kinetic information. If the next frame is a key frame, then the decoder returns to step 2210 to receive the next frame. Otherwise, this routine ends.

3.2 Segmentation

As previously described, segmentation is the process by which a digital image is subdivided into its component parts, i.e., segments, where each segment represents an area bounded by a radical or sharp change in values within the image.

Figure 23:
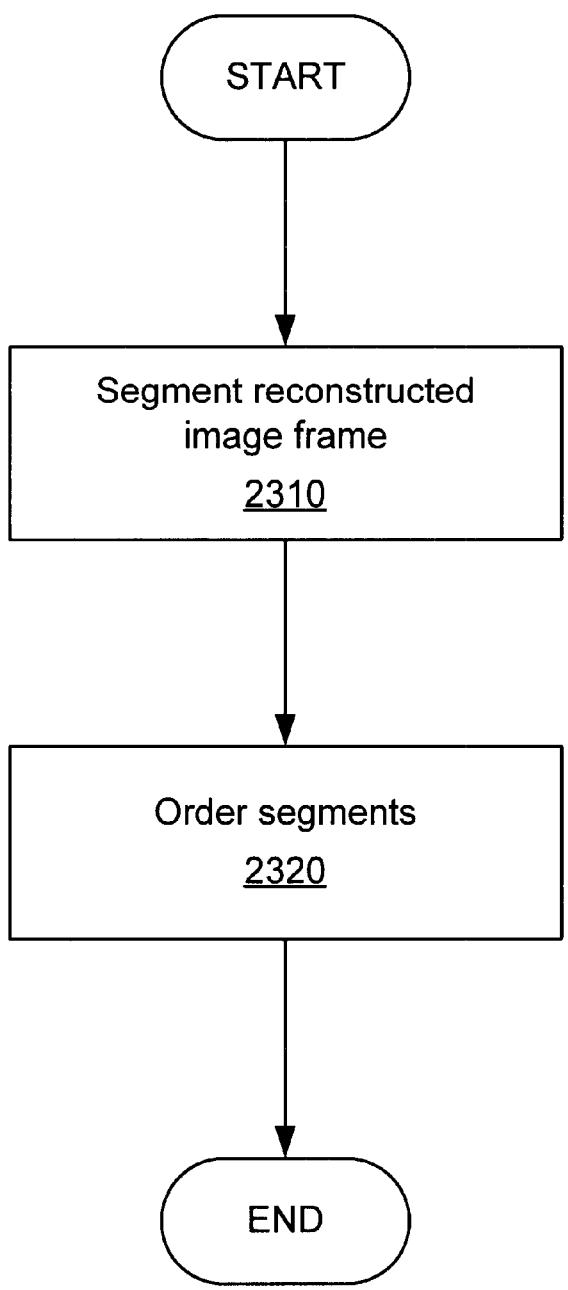
FIG. 23 is a flow chart illustrating segmentation by a decoder according to one embodiment of the invention.

Referring to FIG. 23, at step 2310, the decoder segments the reconstructed reference frame to determine the inherent structural features of the image. For example, the decoder determines that the segments in FIG. 7 are the car, the rear wheel, the front wheel, the rear window, the front window, the street, the sun, and the background. At step 2320, the decoder orders the segments based upon the same predetermined criteria used by the encoder, and marks the segments 1001 through 1007, respectively, as seen in FIG. 10.

3.3 Motion Related Information

Once segmentation has been accomplished, the decoder receives the motion related information regarding the movement of each segment. The motion related information tells the decoder the position of the segment in the new frame relative to its position in the previous frame.

Figure 24:
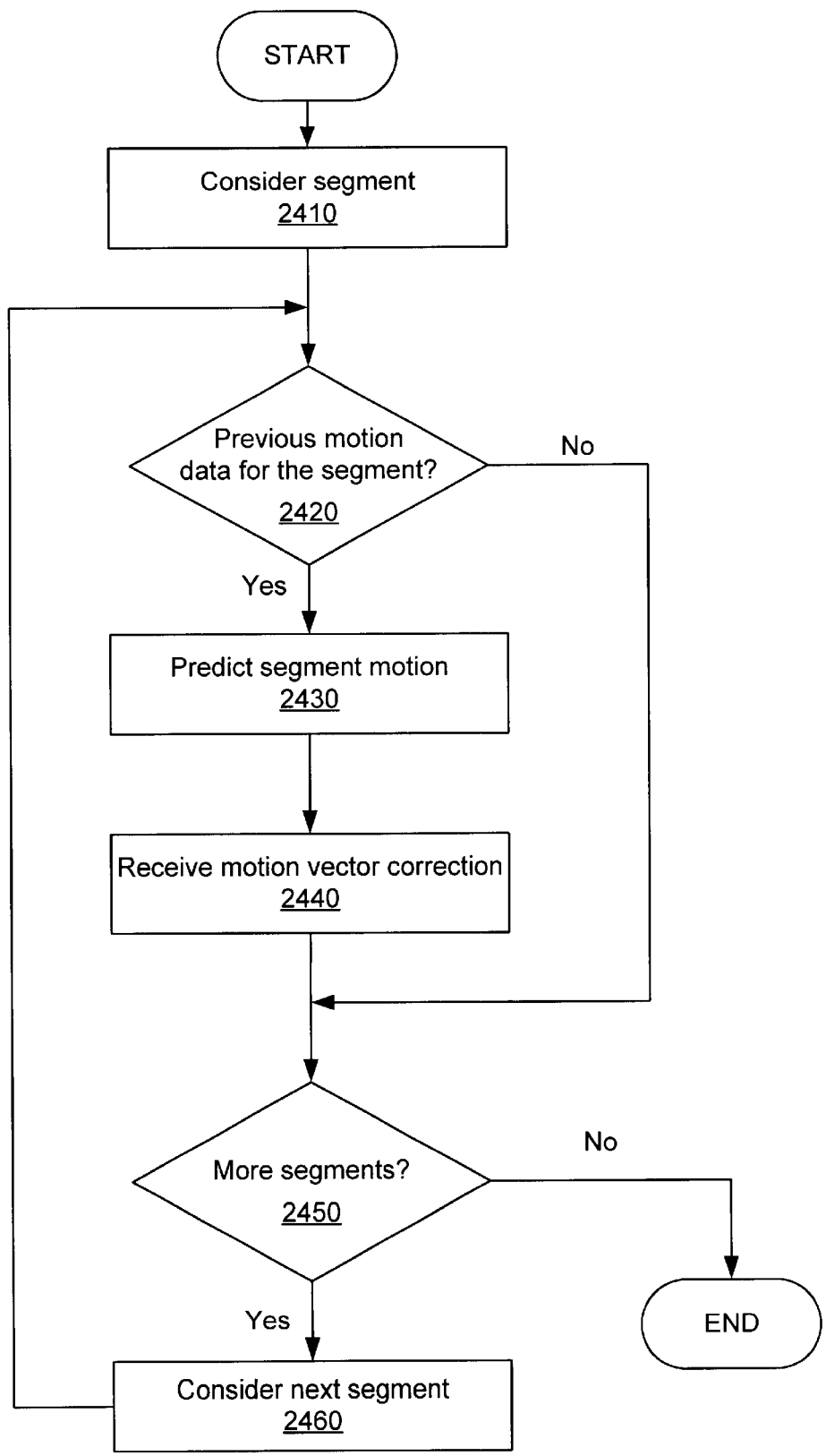
FIG. 24 is a flow chart illustrating a procedure for a decoder to receive motion related information according to one embodiment of the invention.

FIG. 24 illustrates the process of receiving the motion related information. At step 2410, the decoder considers a segment. At step 2420, the decoder decides if there is previous motion data for the segment. If not, the decoder continues at step 2450. If so, the decoder predicts the segment motion at step 2430, then receives the motion vector correction at step 2440, then continues at step 2450. At step 2450, the decoder decides if there are more segments. If so, the decoder considers the next segment at step 2460, then continues at step 2420. If not, the routine ends.

The kinetic information can be reduced if the segments with related motion can be grouped together and represented by one motion vector. The kinetic information received by the decoder depends on several factors: to wit; 1) if the previous (reference) frame is a key frame, and 2) if not, is multi-scaling information available.

Figure 25:
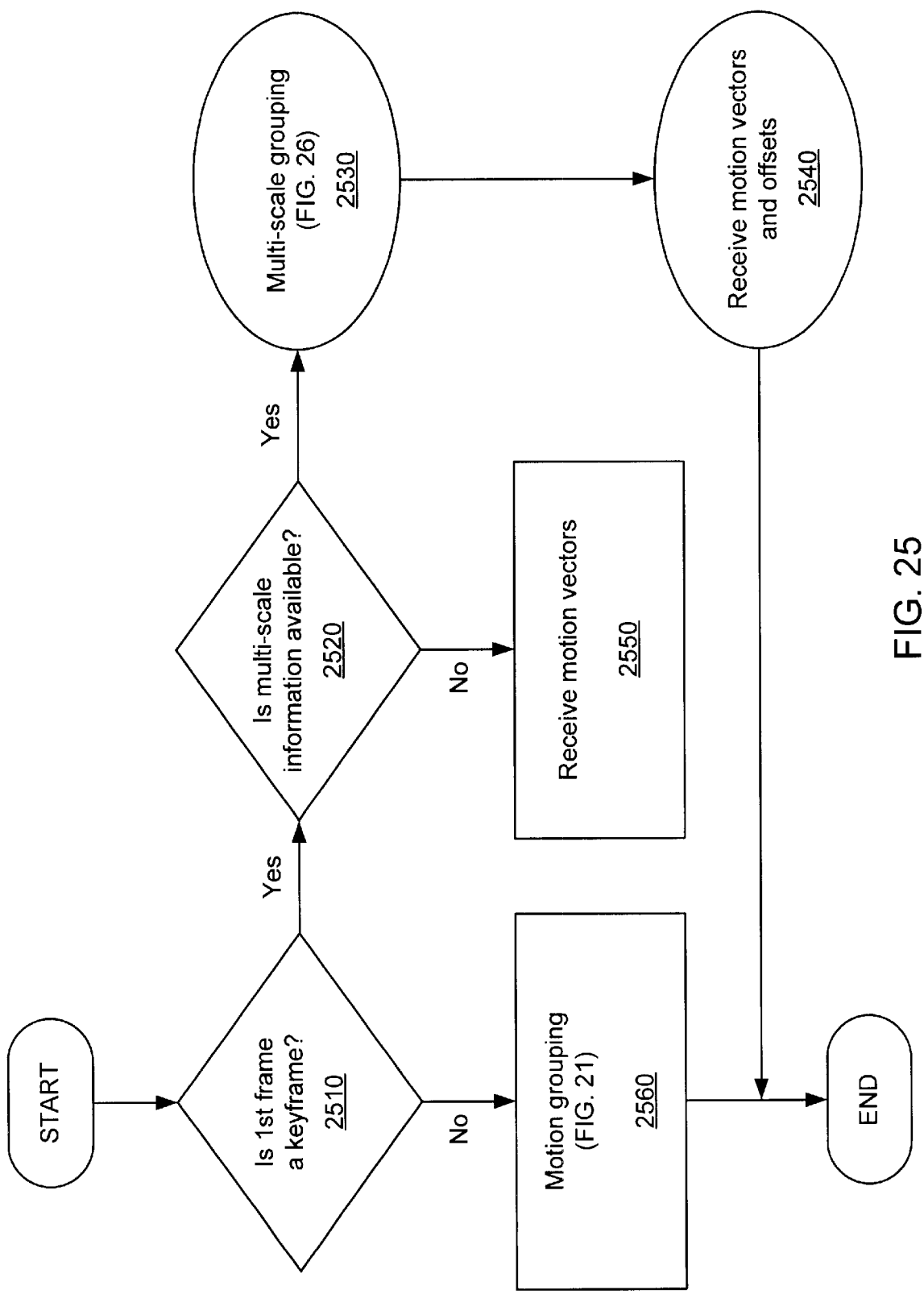
FIG. 25 is a flow chart illustrating a procedure for a decoder to determine if grouping is to be performed according to one embodiment of the invention.

Referring to FIG. 25, at step 2510, the decoder determines if the reference frame is a key frame, i.e., a frame not defined in relation to any other frame. If so, then there is no previous motion related information for potential grouping of segments. However, the decoder attempts to use multi-scale information for segment grouping, if available. At step 2520, the decoder determines if there is multi-scale information available. If the reference frame is a key frame and there is multi-scale information available to the decoder, then, at step 2530, the decoder will initially group related segments together using the multi-scale routine, as described previously with regard to the encoder. Then, at step 2540, the decoder receives the motion vectors and motion vector offsets. Conversely, if there is no multi-scale information available for the reference frame, then at step 2550, the motion vectors (without offsets) are received by the decoder.

However, at step 2510, if the decoder determines that the first frame is not a key frame, then, at step 2560, it executes the motion vector grouping routine as described below. Alternatively, or in addition, it can use the multi-scale grouping described previously.

Figure 26:
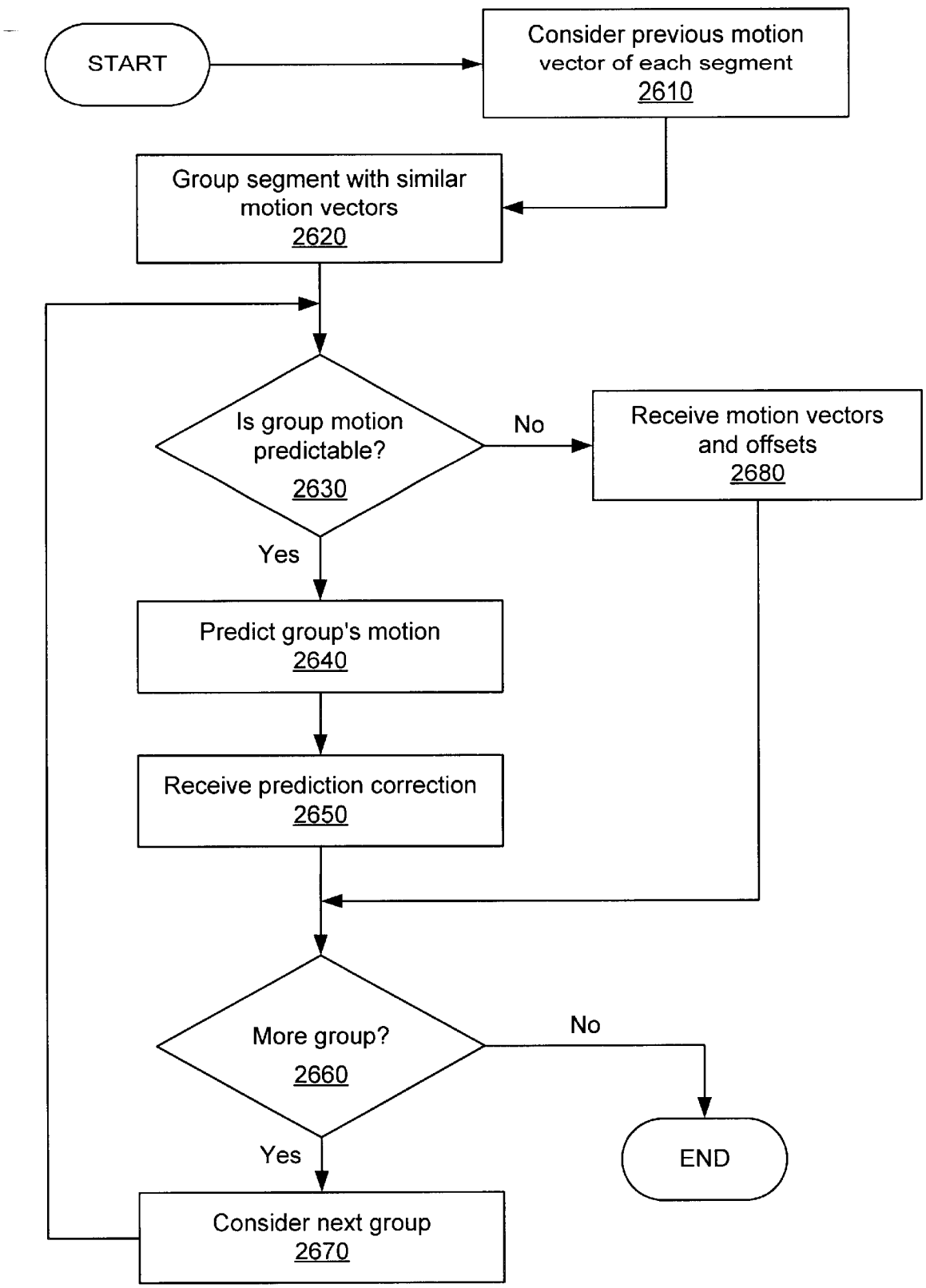
FIG. 26 is a flow chart illustrating a procedure for a decoder to perform motion vector grouping according to one embodiment of the invention.

FIG. 26 illustrates the motion vector grouping routine. At step 2610, the decoder considers the previous motion vectors of each segment. At step 2620, the decoder groups together segments having similar previous motion vectors. At step 2630, the decoder decides if the group motion is predictable. If not, then at step 2680, the decoder receives the motion vectors and offsets, if any, then continues at step 2660. If so, the decoder predicts the group motion at step 2640, then receives the prediction correction at step 2650, then continues at step 2660. At step 2660, the decoder determines if there are more groups. If so, the decoder considers the next group at step 2670, and continues at step 2630. If not, the routine ends.

3.4 Residues

After the motion related information has been received, the decoder receives the residue information. Residue falls under two classifications; background and local residues.

3.4.1. Background Residue

As shown in FIG. 16, as the car moves, previously hidden or obstructed areas may become visible for the first time. The decoder knows where these areas are and orders them using a predetermined ordering scheme. In FIG. 16, three regions become unobstructed, specifically, behind the car, and behind the two wheels. These regions are marked as regions 1601 through 1603.

Figure 27:
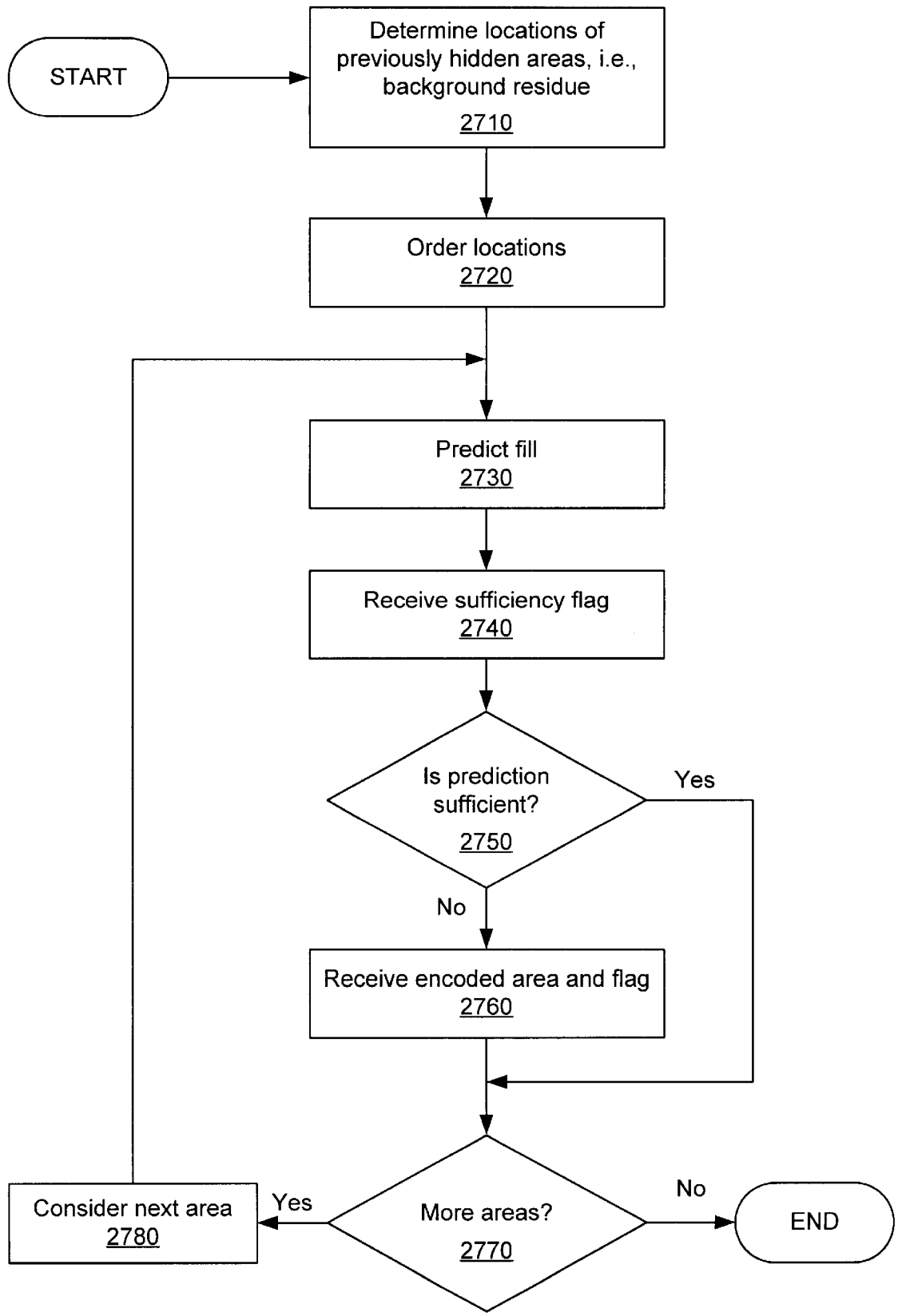
FIG. 27 is a flow chart illustrating a procedure for a decoder to process background residues according to one embodiment of the invention.

Referring to FIG. 27, at step 2710, the decoder considers the background residue regions, then orders the regions at step 2720. At step 2730, the decoder makes a mathematical prediction as to the structure of the first background residue region. At step 2740, the decoder receives a flag denoting how good the prediction was and if correction is needed. At step 2750, the decoder makes a decision whether the prediction is sufficient. If so, the routine continues at step 2770. If not, then at step 2760, the decoder receives the encoded region and the flag denoting the coding scheme and reconstructs as necessary, then continues at step 2770. At step 2770, the decoder decides if there are more background residue regions. If so, the decoder, at step 2780, considers the next region and continues at step 2730. Otherwise, the routine ends.

3.4.2 Local Residues

Residue information consists of information resulting from inexact matches and appearance of new information, In FIG. 18, the car and sun appear smaller in frame 1802 than in frame 1801. The structure of the residue will depend on how different the new segments are from the previous segments. The decoder knows that most of the local residues will appear at the boundaries of segments. The decoder's knowledge of structural information including locations of segment boundaries can be taken into consideration to improve the efficiency of local residue coding.

Figure 28:
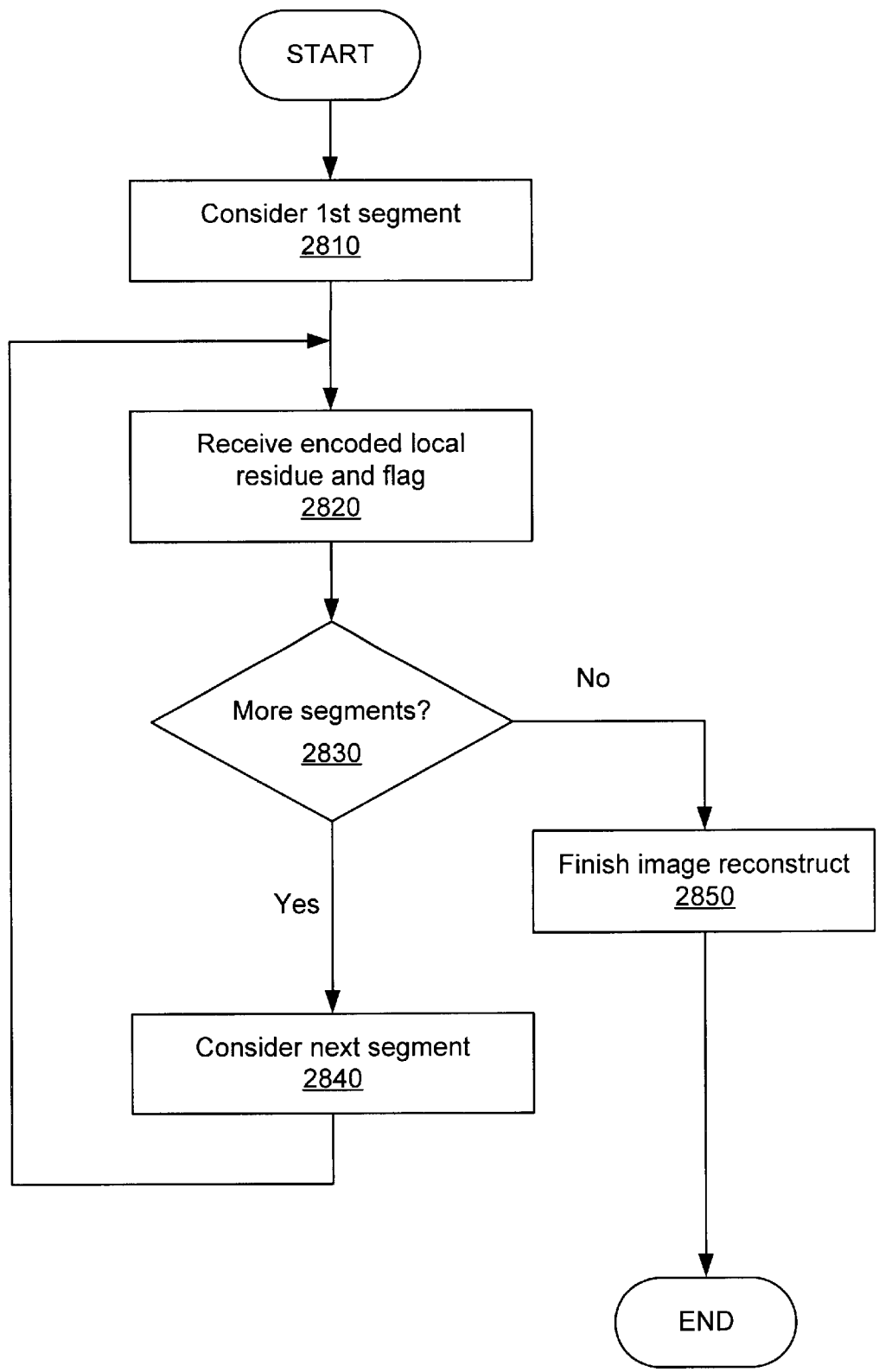
FIG. 28 is a flow chart illustrating a procedure for a decoder to process local residues according to one embodiment of the invention.

Referring to FIG. 28, at step 2810, the decoder considers the first segment. At step 2820, the decoder receives a flag, if necessary, denoting the coding method and receives the encoded local residue for that segment. At step 2830 the decoder determines if there are any more segments. If so, the decoder considers the next segment at step 2840, then continues at step 2820. Otherwise, the routine ends.

3.4 Z-Ordering

Z-ordering refers to the depth position of each segment within an image frame. The decoder uses Z-ordering information to determine which segments will be completely visible and which ones will be partially or totally hidden.

3.5 Reconstruction

Finally, the frame is reconstructed based upon the determined motion related information and the residues.

3.6 Special Instructions and Object-Based Image Manipulation

In addition to structural information regarding the image, the decoder is capable of receiving and executing commands embedded within the bitstream and associated with the various segments. If the encoder and decoder are synchronized and are working with the same reference frame, the encoder is not required to transmit the structural information associated with the commands. Also, embedded commands can be held in abeyance until a user-driven event, e.g., a mouseclick, occurs.

Figure 29:
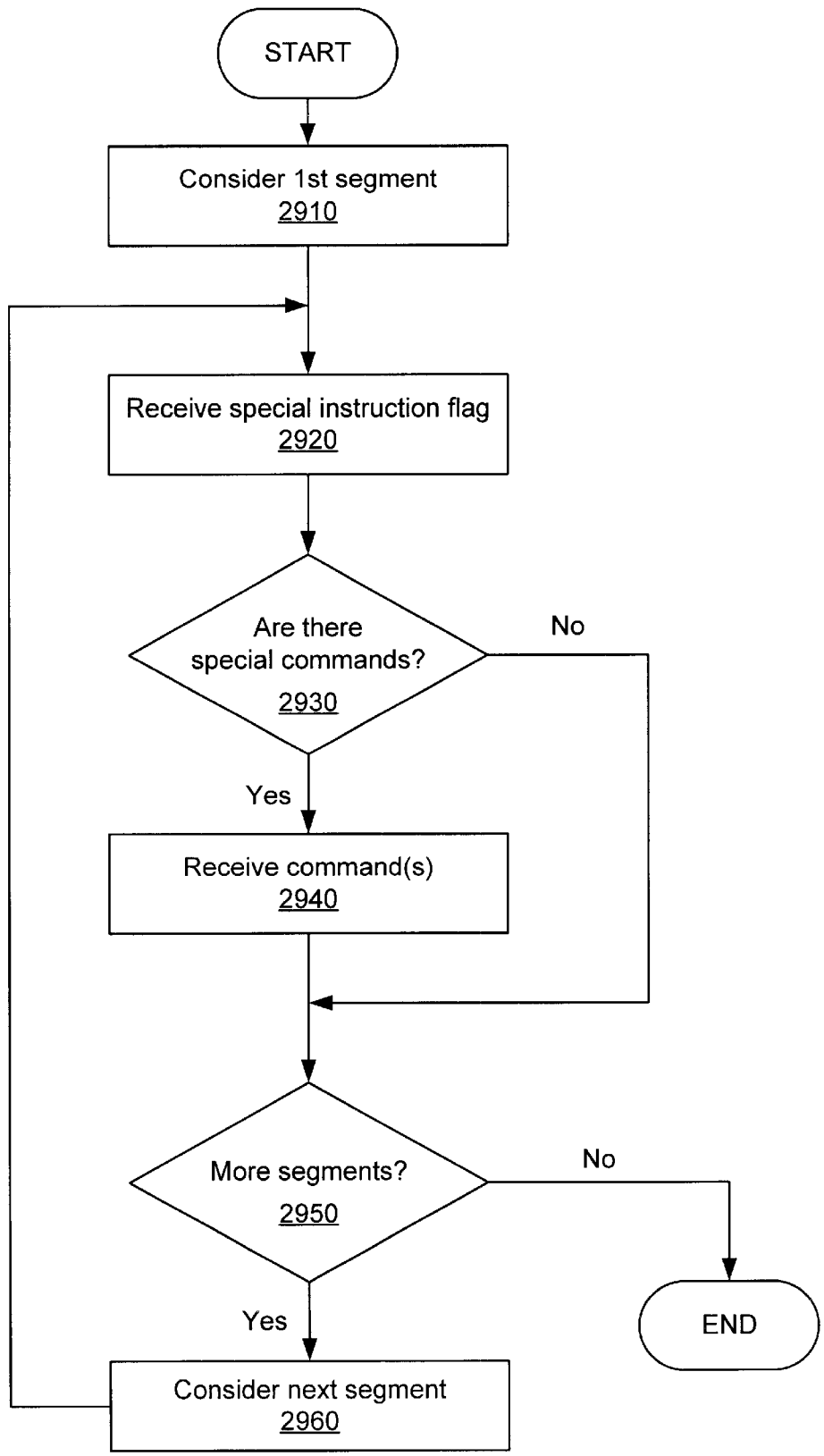
FIG. 29 is a flow chart illustrating a procedure for embedding commands according to one embodiment of the invention.

FIG. 29 illustrates a procedure for processing embedded commands according to one embodiment of the invention. At step 2910, the decoder considers the first segment. At step 2920, the decoder receives a special instruction flag. At step 2930, the decoder determines if there are special instructions or commands associated with the segment. If so, then the decoder receives the command(s) at step 2940, then continues at step 2950. If not, the decoder goes directly to step 2950, where it determines if there are any more segments. If there are more segments, the decoder considers the next segment at step 2960 after which it returns to step 2920. If there are no more segments the routine ends.

Figure 30:
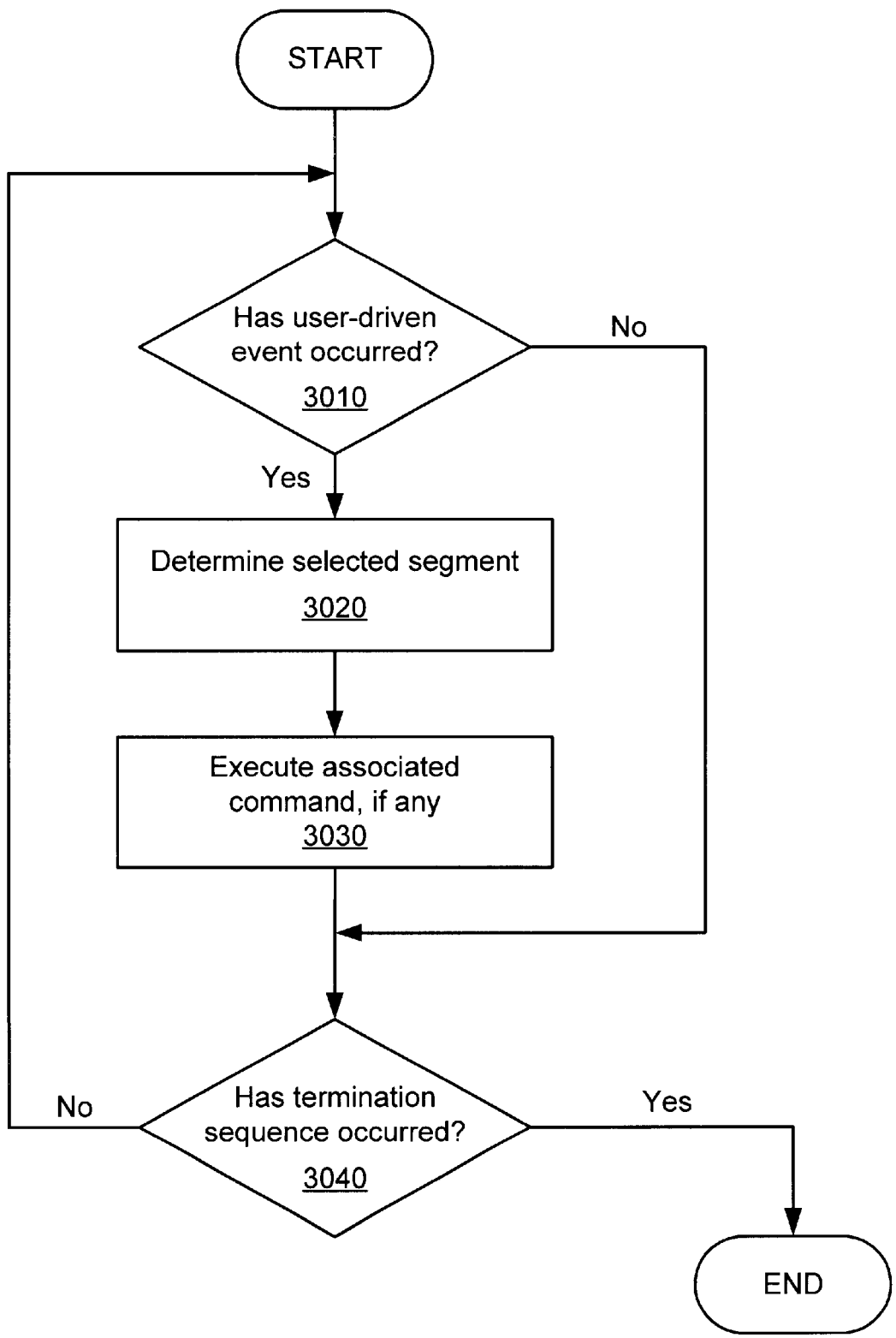
FIG. 30 is a flow chart illustrating a procedure for handling user-driven events according to one embodiment of the invention.

FIG. 30 is a flow chart illustrating a procedure for handling user-driven events according to one embodiment of the present invention. At step 3010, the decoder determines if a user-driven event has occurred. If so, at step 3020 the decoder determines which segment to which the user-driven event refers. Then, at step 3030, the associated command is executed. Then, at step 3040, the decoder determines if a termination sequence has occurred. If so, the routine begins again at step 3010. If not, the routine ends.

If, at step 3010, the decoder determines that no user-driven event has occurred, then the decoder proceeds directly to step 3040.

The capability of the decoder to compute structural information such as segmentation can be leveraged to greatly reduce the overhead of having to send much of the structural information along with the special instructions that may be attached to them.

For example, objects or distinct features in the image, being represented by discrete segments, can conveniently be manipulated as separate entities. Such manipulations might include, without limitation: (a) editing within a frame; (b) exporting to other images or applications; and (c) interactive operations based on user inputs. In a system in which an encoder and decoder are synchronized, the manipulated object or feature could be immediately re-encoded for reintroduction into the present or some other video stream. In this fashion, the techniques of the present invention overcome the bit- or pixel-based limitations of traditional video encoding, and make it useful as a tool for modeling actual objects.

3.7

Alternatively, the decoder, once it has determined the structural information of the video frame, it determines the best set of basis functions which could be used to describe a second video frame. The decoder then receives the coefficients from the encoder and reconstructs the second image frame. Since both the encoder and the decoder independently create and order the same basis functions from the structural information available, thus only the coefficients of the basis functions need be transmitted. This is an adaptive coding or adaptive transform coding method.

4.0 Video Format

The invention disclosed herein also described a new video format for transmitting video data. This video format consists of kinetic information associated with the structural information of the image frame. This structural information can include, but is not limited to, motion related information, residue information, and special instructions.

Alternatively, this new video format may consist of a sequence of coefficients which are derived from a set of basis functions.

5.0 Conclusion

The foregoing sections have generally described the operation of the encoder and decoder, using flowcharts, in a manner that will allow one of ordinary skill in the art to implement them in virtually any computer-based environment. Such implementations are not limited to particular software and/or hardware environments. For example, they could be implemented entirely in software, using virtually any programming language, as a series of functional modules (e.g., I/O module, motion matching module, residue module, etc.) on a general purpose computer. Alternatively, for faster operation, they could be implemented entirely as hardware, for example, in a custom VLSI chip. Still other implementations might include virtually any combination of software and hardware, as dictated by the particular speed, cost, and transportability needs of the particular operating environment.

All of the foregoing illustrates exemplary embodiments and applications of the invention, from which related variations, enhancements and modifications will be apparent without departing from the spirit and scope of the invention. Therefore, the invention should not be limited to the foregoing disclosure, but rather construed by the claims appended hereto.

What is claimed is:

1. An encoder comprising:
   (a) a first module configured to receive a first video frame;
   (b) a second module configured to encode said first video frame;
   (c) a third module configured to decode said first video frame;
   (d) a fourth module configured to determine the structural characteristics of said first video frame;
   (e) a fifth module configured to order said structural characteristics of said first video frame;
   (f) a sixth module configured to obtain a second video frame;
   (g) a seventh module configured to code a difference between said structural characteristics of said first video frame and the structural characteristics of said second video frame; and
   (h) an eighth module configured to transmit said difference.

2. A decoder comprising:
   (a) a first module configured to receive a first video frame;
   (b) a second module configured to decode said first video frame;
   (c) a third module configured to determine the structural characteristics of said first video frame;
   (d) a fourth module configured to order said structural characteristics of said first video frame;

(e) a fifth module for receiving a difference between said structural characteristics of said first video frame and the structural characteristics of a second video frame; and (f) a module for decoding the difference.

3. A codec for encoding video information and decoding that video information, wherein the video information comprises at least a plurality of frames wherein each frame represents an image of the video information, the codec comprising:

an encoder comprising:
   a) an input to receive video information including at least a first frame and a second frame;
   b) a segmenter that generates a segmentation of at least the first frame, wherein a segmentation represents an association of pixels of a frame with segments based on at least pixel values or image content;
   c) a kinetic information generator that generates kinetic information that represents relative motion of segments between the first frame and the second frame, wherein relative motion relates to changes in position of segments between the first and second frames;
   d) logic to encode the first frame to form a first encoded frame; and
   e) logic to encode the second frame to form a second encoded frame, wherein the second encoded frame includes at least some of the kinetic information; and a decoder comprising:
   a) an input to receive the first encoded frame and the second encoded frame;
   b) logic to decode the first encoded frame to form a first reconstructed frame;
   c) a segmenter that generates a segmentation of at least the first reconstructed frame; and
   d) logic to decode the second encoded frame to form a second reconstructed frame using at least some of the segmentation generated by the segmenter of the decoder and using at least some of the kinetic information encoded in the second encoded frame; and wherein the encoder's segmenter and the decoder's segmenter are such that they generate ordered lists of segments and generate the same ordered list for a given image frame.

4. A codec for encoding video information and decoding that video information, wherein the video information comprises at least a plurality of frames wherein each frame represents an image of the video information, the codec comprising:

an encoder comprising:
   a) an input to receive video information including at least a first frame and a second frame;
   b) a segmenter that generates a segmentation of at least the first frame, wherein a segmentation represents an association of pixels of a frame with segments based on at least pixel values or image content;
   c) a kinetic information generator that generates kinetic information that represents relative motion of segments between the first frame and the second frame, wherein relative motion relates to changes in position of segments between the first and second frames;
   d) logic to encode the first frame to form a first encoded frame; and
   e) logic to encode the second frame to form a second encoded frame, wherein the second encoded frame includes at least some of the kinetic information; and a decoder comprising:
   a) an input to receive the first encoded frame and the second encoded frame;
   b) logic to decode the first encoded frame to form a first reconstructed frame;
   c) a segmenter that generates a segmentation of at least the first reconstructed frame; and
   d) logic to decode the second encoded frame to form a second reconstructed frame using at least some of the segmentation generated by the segmenter of the decoder and using at least some of the kinetic information encoded in the second encoded frame; and wherein the encoder's segmenter and the decoder's segmenter are such that they group segments and generate the same grouping for a given image frame.

5. A codec for encoding video information and decoding that video information, wherein the video information comprises at least a plurality of frames wherein each frame represents an image of the video information, the codec comprising:

an encoder comprising:
   a) an input to receive video information including at least a first frame and a second frame;
   b) a segmenter that generates a segmentation of at least the first frame, wherein a segmentation represents an association of pixels of a frame with segments based on at least pixel values or image content;
   c) a kinetic information generator that generates kinetic information that represents relative motion of segments between the first frame and the second frame, wherein relative motion relates to changes in position of segments between the first and second frames;
   d) logic to encode the first frame to form a first encoded frame; and
   e) logic to encode the second frame to form a second encoded frame, wherein the second encoded frame includes at least some of the kinetic information; and a decoder comprising:
   a) an input to receive the first encoded frame and the second encoded frame;
   b) logic to decode the first encoded frame to form a first reconstructed frame;
   c) a segmenter that generates a segmentation of at least the first reconstructed frame; and
   d) logic to decode the second encoded frame to form a second reconstructed frame using at least some of the segmentation generated by the segmenter of the decoder and using at least some of the kinetic information encoded in the second encoded frame; and wherein the kinetic information includes a group motion vector associated with a group of a plurality of segments at least one motion vector offset associated with a segment within the group, wherein the at least one motion vector offset represents motion of the segment relative to motion of the group.

6. An encoder for encoding video information, wherein the video information comprises at least a plurality of frames wherein each frame represents an image of the video information, the encoder comprising:

an input to receive video information including at least a first frame and a second frame;

logic to encode the first frame to form a first encoded frame;

logic to determine a first reconstructed frame, wherein the first reconstructed frame is a frame that would result from a decoding of the first encoded frame;

a segmenter that generates a segmentation of at least the first reconstructed frame, wherein a segmentation represents an association of pixels of a frame with segments based on at least pixel values or image content;

a kinetic information generator that generates kinetic information that represents relative motion of segments between the first reconstructed frame and the second frame, wherein relative motion relates to changes in position of segments between the first reconstructed frame and the second frame; and logic to encode the second frame to form a second encoded frame, wherein the second encoded frame includes at least some of the kinetic information and is encoded such that the second frame is reconstructable from the second encoded frame using at least a part of the segmentation of at least the first reconstructed frame; and further comprising:
    a command input configured to obtain embedded information, wherein the embedded information comprises commands to be embedded within the video information and associated with segments of a frame; and
    means for combining difference information and embedded information into the video information.

7. An encoder for encoding video information, wherein the video information comprises at least a plurality of frames wherein each frame represents an image of the video information, the encoder comprising:

an input to receive video information including at least a first frame and a second frame;

logic to encode the first frame to form a first encoded frame;

logic to determine a first reconstructed frame, wherein the first reconstructed frame is a frame that would result from a decoding of the first encoded frame;

a segmenter that generates a segmentation of at least the first reconstructed frame, wherein a segmentation represents an association of pixels of a frame with segments based on at least pixel values or image content;

a kinetic information generator that generates kinetic information that represents relative motion of segments between the first reconstructed frame and the second frame, wherein relative motion relates to changes in position of segments between the first reconstructed frame and the second frame; and logic to encode the second frame to form a second encoded frame, wherein the second encoded frame includes at least some of the kinetic information and is encoded such that the second frame is reconstructable from the second encoded frame using at least a part of the segmentation of at least the first reconstructed frame; and where the segmenter is configured to segment a collection of segments having a segment order among the segments.

8. A decoder for decoding video information, wherein the video information comprises at least a plurality of frames wherein each frame represents an image of the video information, the decoder comprising:

an input to receive the first encoded frame and the second encoded frame;

logic to decode the first encoded frame to form a first reconstructed frame;

a segmenter that generates a segmentation of at least the first reconstructed frame; and logic to decode the second encoded frame to form a second reconstructed frame using the segmentation generated by the segmenter of the decoder and difference information encoded in the second encoded frame; and where the segmenter is configured to segment to a collection of segments having a segment order among the segments.

9. A decoder for decoding video information, wherein the video information comprises at least a plurality of frames wherein each frame represents an image of the video information, the decoder comprising:

an input to receive the first encoded frame and the second encoded frame;

logic to decode the first encoded frame to form a first reconstructed frame;

a segmenter that generates a segmentation of at least the first reconstructed frame; and logic to decode the second encoded frame to form a second reconstructed frame using the segmentation generated by the segmenter of the decoder and difference information encoded in the second encoded frame; and wherein the segmenter is such that it generates segments according to a segment order where the segment order is consistent with an encoded segment order used by an encoder to encode the video information.

10. A method of encoding video information, wherein the video information comprises at least a plurality of frames wherein each frame codes for an image of the video information, the method comprising:

obtaining a first frame of the plurality of frames;

encoding the first frame to form a first encoded frame;

determining a first reconstructed frame, wherein the first reconstructed frame is a frame that would result from a decoding of the first encoded frame;

obtaining segmentation information about the first frame, wherein the segmentation information relates to segmenting the image of the first frame based on image content of the first frame;

obtaining a second frame of the plurality of frames;

computing difference information for the first and second frames, wherein the difference information relates segments of the first and second frames; and generating encoded video information that includes at least some of the difference information and is such that the second frame is reconstructable by a decoder from the encoded video information based on segmentation information generated by the decoder for the first frame; and further comprising:
    associating a plurality of segments of the first frame into a group association of at least one group wherein the associating is based on common characteristics among the segments; and
    including a representation of the group association in the encoded video information.

11. A method of encoding video information, wherein the video information comprises at least a plurality of frames wherein each frame codes for an image of the video information, the method comprising:

obtaining a first frame of the plurality of frames;

encoding the first frame to form a first encoded frame;

determining a first reconstructed frame, wherein the first reconstructed frame is a frame that would result from a decoding of the first encoded frame;

obtaining segmentation information about the first frame, wherein the segmentation information relates to segmenting the image of the first frame based on image content of the first frame;

obtaining a second frame of the plurality of frames;

computing difference information for the first and second frames, wherein the difference information relates segments of the first and second frames; and generating encoded video information that includes at least some of the difference information and is such that the second frame is reconstructable by a decoder from the encoded video information based on segmentation information generated by the decoder for the first frame; and wherein at least one group association is based on at least one of kinetic information and information from a plurality of resolution scales.

12. A method of encoding video information, wherein the video information comprises at least a plurality of frames wherein each frame codes for an image of the video information, the method comprising:

obtaining a first frame of the plurality of frames;

encoding the first frame to form a first encoded frame;

determining a first reconstructed frame, wherein the first reconstructed frame is a frame that would result from a decoding of the first encoded frame;

obtaining segmentation information about the first frame, wherein the segmentation information relates to segmenting the image of the first frame based on image content of the first frame;

obtaining a second frame of the plurality of frames;

computing difference information for the first and second frames, wherein the difference information relates segments of the first and second frames; and generating encoded video information that includes at least some of the difference information and is such that the second frame is reconstructable by a decoder from the encoded video information based on segmentation information generated by the decoder for the first frame; and further comprising:

associating a group motion vector with the at least one group;

associating at least one motion vector offset with at least one segment within the at least one group, wherein the at least one motion vector offset represents motion of the at least one segment relative to motion of the at least one group; and including a representation of one or more group motion vector and one or more motion vector offset in the encoded video information.

13. A method of encoding video information, wherein the video information comprises at least a plurality of frames wherein each frame codes for an image of the video information, the method comprising:

obtaining a first frame of the plurality of frames;

encoding the first frame to form a first encoded frame;

determining a first reconstructed frame, wherein the first reconstructed frame is a frame that would result from a decoding of the first encoded frame;

obtaining segmentation information about the first frame, wherein the segmentation information relates to segmenting the image of the first frame based on image content of the first frame;

obtaining a second frame of the plurality of frames;

computing difference information for the first and second frames, wherein the difference information relates segments of the first and second frames; and generating encoded video information that includes at least some of the difference information and is such that the second frame is reconstructable by a decoder from the encoded video information based on segmentation information generated by the decoder for the first frame; and further comprising:

determining difference information representing differences in image data between the first frame and the second frame; and using the difference information in generating the encoded video information; and wherein determining difference information comprises predicting difference information from the difference information of previous frames; and wherein predicting difference information comprises predicting using z-ordering information.

14. A method of encoding video information, wherein the video information comprises at least a plurality of frames wherein each frame codes for an image of the video information, the method comprising:

obtaining a first frame of the plurality of frames;

encoding the first frame to form a first encoded frame;

determining a first reconstructed frame, wherein the first reconstructed frame is a frame that would result from a decoding of the first encoded frame;

obtaining segmentation information about the first frame, wherein the segmentation information relates to segmenting the image of the first frame based on image content of the first frame;

obtaining a second frame of the plurality of frames;

computing difference information for the first and second frames, wherein the difference information relates segments of the first and second frames; and generating encoded video information that includes at least some of the difference information and is such that the second frame is reconstructable by a decoder from the encoded video information based on segmentation information generated by the decoder for the first frame; and further comprising:

determining difference information representing differences in image data between the first frame and the second frame; and using the difference information in generating the encoded video information; and wherein the difference information includes z-ordering information usable to perform z-ordering of segments in the second frame.

15. A method of encoding video information, wherein the video information comprises at least a plurality of frames wherein each frame codes for an image of the video information, the method comprising:

obtaining a first frame of the plurality of frames;

encoding the first frame to form a first encoded frame;

determining a first reconstructed frame, wherein the first reconstructed frame is a frame that would result from a decoding of the first encoded frame;

obtaining segmentation information about the first frame, wherein the segmentation information relates to segmenting the image of the first frame based on image content of the first frame;

obtaining a second frame of the plurality of frames;

computing difference information for the first and second frames, wherein the difference information relates segments of the first and second frames; and generating encoded video information that includes at least some of the difference information and is such that the second frame is reconstructable by a decoder from the encoded video information based on segmentation information generated by the decoder for the first frame; and further comprising:

determining z-orders for segments of the first frame; and using the z-orders in generating the encoded video information.

16. A method of encoding video information, wherein video information comprises at least a plurality of frames wherein each frame codes for an image of the video information, the method comprising:

obtaining a first frame of the plurality of frames;

encoding the first frame to form a first encoded frame;

determining a first reconstructed frame, wherein the first reconstructed frame is a frame that would result from a decoding of the first encoded frame;

obtaining segmentation information about the first frame, wherein the segmentation information relates to segmenting the image of the first frame based on image content of the first frame;

obtaining a second frame of the plurality of frames;

computing difference information for the first and second frames, wherein the difference information relates segments of the first and second frames; and generating encoded video information that includes at least some of the difference information and is such that the second frame is reconstructable by a decoder from the encoded video information based on segmentation information generated by the decoder for the first frame; and further comprising embedding instructions in the encoded video information, wherein at least some of the embedded instructions are associated with the segmentation information about the first frame.

17. A method of decoding video information, wherein the video information comprises at least a plurality of frames wherein each frame codes for an image of the video information, the plurality of frames including at least one frame designated as a keyframe, the method comprising:

obtaining an encoded keyframe;

reconstructing a keyframe from the encoded keyframe;

computing segmentation information about the keyframe from the reconstructed keyframe, wherein the segmentation information relates to segmenting the image of the keyframe based on image content of the keyframe;

obtaining an encoded intermediate frame including difference information relating segments between the keyframe and the intermediate frame; and reconstructing an intermediate frame from the encoded intermediate frame using at least some of the difference information and at least some of the segmentation information; and wherein the encoded keyframe contains segmentation augmentation information about the keyframe and the decoder computes the segmentation of the keyframe taking into account the segmentation augmentation information.

18. A method of decoding video information, wherein the video information comprises at least a plurality of frames wherein each frame codes for an image of the video information, the plurality of frames including at least one frame designated as a keyframe, the method comprising:

obtaining an encoded keyframe;

reconstructing a keyframe from the encoded keyframe;

computing segmentation information about the keyframe from the reconstructed keyframe, wherein the segmentation information relates to segmenting the image of the keyframe based on image content of the keyframe;

obtaining an encoded intermediate frame including difference information relating segments between the keyframe and the intermediate frame; and reconstructing an intermediate frame from the encoded intermediate frame using at least some of the difference information and at least some of the segmentation information; and wherein the segments are other than simple polygons.

19. A method of decoding video information, wherein the video information comprises at least a plurality of frames wherein each frame codes for an image of the video information, the plurality of frames including at least one frame designated as a keyframe, the method comprising:

obtaining an encoded keyframe;

reconstructing a keyframe from the encoded keyframe;

computing segmentation information about the keyframe from the reconstructed keyframe, wherein the segmentation information relates to segmenting the image of the keyframe based on image content of the keyframe;

obtaining an encoded intermediate frame including difference information relating segments between the keyframe and the intermediate frame; and reconstructing an intermediate frame from the encoded intermediate frame using at least some of the difference information and at least some of the segmentation information; and further comprising:

associating a plurality of segments of the first frame into a group association of at least one group wherein the associating is based on common characteristics among the segments; and including a representation of the group association in the video information.

20. The method of claim 19, wherein at least one group association is based on at least one of kinetic information and information from a plurality of resolution scales.

21. A method of decoding video information, wherein the video information comprises at least a plurality of frames wherein each frame codes for an image of the video information, the plurality of frames including at least one frame designated as a keyframe, the method comprising:

obtaining an encoded keyframe;

reconstructing a keyframe from the encoded keyframe;

computing segmentation information about the keyframe from the reconstructed keyframe, wherein the segmentation information relates to segmenting the image of the keyframe based on image content of the keyframe;

obtaining an encoded intermediate frame including difference information relating segments between the keyframe and the intermediate frame; and reconstructing an intermediate frame from the encoded intermediate frame using at least some of the difference information and at least some of the segmentation information; and wherein the plurality of motion vectors represents motion of a plurality of segment groups.

22. The method of claim 21, wherein the plurality of motion vectors includes at least one motion vector offset corresponding to at least one segment within said group.

23. A method of decoding video information, wherein the video information comprises at least a plurality of frames wherein each frame codes for an image of the video information, the plurality of frames including at least one frame designated as a keyframe, the method comprising:

obtaining an encoded keyframe;

reconstructing a keyframe from the encoded keyframe;

computing segmentation information about the keyframe from the reconstructed keyframe, wherein the segmentation information relates to segmenting the image of the keyframe based on image content of the keyframe;

obtaining an encoded intermediate frame including difference information relating segments between the keyframe and the intermediate frame; and reconstructing an intermediate frame from the encoded intermediate frame using at least some of the difference information and at least some of the segmentation information; and further comprising:
predicting the difference information;
obtaining a difference between the predicted difference information and the true difference information; and
using the difference between predicted and true difference information in reconstructing the intermediate frame; and further comprising using z-ordering information to predict the predicted difference information.

24. A method of decoding video information, wherein the video information comprises at least a plurality of frames wherein each frame codes for an image of the video information, the plurality of frames including at least one frame designated as a keyframe, the method comprising:

obtaining an encoded keyframe;

reconstructing a keyframe from the encoded keyframe;

computing segmentation information about the keyframe from the reconstructed keyframe, wherein the segmentation information relates to segmenting the image of the keyframe based on image content of the keyframe;

obtaining an encoded intermediate frame including difference information relating segments between the keyframe and the intermediate frame; and reconstructing an intermediate frame from the encoded intermediate frame using at least some of the difference information and at least some of the segmentation information; and further comprising receiving embedded instructions in the encoded video information, wherein at least some of the embedded instructions are associated with the segmentation information about the keyframe.

25. The method of claim 24, wherein at least one embedded instruction is associated with a segment in more than one frame.

* * * * *